(12) United States Patent
Bae et al.

(10) Patent No.: US 12,489,486 B2
(45) Date of Patent: Dec. 2, 2025

(54) CURRENT-TO-VOLTAGE CONVERTER, TRANSCEIVER, AND WIRELESS COMMUNICATION DEVICE

(71) Applicant: SAMSUNG ELECTRONICS CO., LTD., Suwon-si (KR)

(72) Inventors: Jeongyeol Bae, Suwon-si (KR); Taejong Kim, Suwon-si (KR); Sangsung Lee, Suwon-si (KR); Jongsoo Lee, Suwon-si (KR); Jiyoung Lee, Suwon-si (KR); Jongmin Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 18/230,926

(22) Filed: Aug. 7, 2023

(65) Prior Publication Data
US 2024/0080060 A1 Mar. 7, 2024

(30) Foreign Application Priority Data
Sep. 1, 2022 (KR) .................. 10-2022-0111007

(51) Int. Cl.
*H04B 1/40* (2015.01)
*H03F 3/45* (2006.01)
(52) U.S. Cl.
CPC ........... *H04B 1/40* (2013.01); *H03F 3/45475* (2013.01); *H03F 2200/165* (2013.01); *H03F 2200/171* (2013.01); *H03F 2200/451* (2013.01)

(58) Field of Classification Search
None
See application file for complete search history.

(56) References Cited

U.S. PATENT DOCUMENTS

| 7,868,701 B2 * | 1/2011 | Nakamura ........... H03G 1/0088 330/308 |
| 7,933,361 B2 | 4/2011 | Huang et al. |
| 8,406,358 B1 | 3/2013 | Uehara et al. |

(Continued)

FOREIGN PATENT DOCUMENTS

| JP | 6825598 B2 | 2/2021 |
| KR | 10-0812228 B1 | 3/2008 |

*Primary Examiner* — Pablo N Tran
(74) *Attorney, Agent, or Firm* — Sughrue Mion, PLLC

(57) ABSTRACT

The present disclosure provides apparatuses for converting a current signal into a voltage signal. In some embodiments, a current-to-voltage converter includes a transimpedance amplifier, a first filter circuit coupled between an input node of the transimpedance amplifier and an internal node of the transimpedance amplifier, and a second filter circuit coupled between the input node of the transimpedance amplifier and an output node of the transimpedance amplifier. The first filter circuit is configured to operate as a low-pass filter with respect to the current signal. The second filter circuit is configured to operate as a band-pass filter with respect to the current signal. In some embodiments, a transceiver includes a receiver circuit that includes a current-to-voltage converter, a transmitter circuit. The current-to-voltage converter is configured to convert a current signal corresponding to a first reception signal into a voltage signal corresponding to a second reception signal.

20 Claims, 22 Drawing Sheets

(56) References Cited

U.S. PATENT DOCUMENTS

| | | | |
|---|---|---|---|
| 8,666,343 B2* | 3/2014 | Shanan | H04L 25/06 |
| | | | 455/283 |
| 9,136,904 B2 | 9/2015 | Ali et al. | |
| 9,344,124 B2* | 5/2016 | Lau | H04B 1/1027 |
| 9,397,721 B2 | 7/2016 | Pehlke | |
| 9,479,132 B2 | 10/2016 | Heikkinen et al. | |
| 9,496,826 B2* | 11/2016 | Sugimoto | H03F 1/0205 |
| 10,979,256 B2* | 4/2021 | Sun | H03G 1/0088 |
| 11,595,069 B2* | 2/2023 | Woo | H04B 1/40 |
| 2011/0234312 A1* | 9/2011 | Lachhwani | H03F 3/45475 |
| | | | 330/104 |
| 2017/0105184 A1* | 4/2017 | Kim | H04W 52/52 |

\* cited by examiner

CURRENT-TO-VOLTAGE CONVERTER, TRANSCEIVER, AND WIRELESS COMMUNICATION DEVICE

CROSS-REFERENCE TO RELATED APPLICATION

This application claims benefit of priority under 35 U.S.C. § 119 to Korean Patent Application No. 10-2022-0111007, filed on Sep. 1, 2022, in the Korean Intellectual Property Office, the disclosure of which is incorporated by reference herein in its entirety.

BACKGROUND

1. Field

The present disclosure relates generally to a current-to-voltage converter, and more particularly, to a transceiver including a current-to-voltage converter and a wireless communication device including the transceiver.

2. Description of Related Art

To achieve a high data transmission rate, related wireless communication systems may have been embodied to perform communication in a high-frequency band. For example, to alleviate a path loss and increase a propagation range in fifth generation (5G) communication systems, beamforming, massive multiple-input multiple-output (MIMO), full dimension MIMO (FD-MIMO), array antenna, analog beamforming, and a large scale antenna technique have been introduced.

For example, when a transceiver included in a related wireless communication device of a related 5G communication system simultaneously transmits and receives signals in a high-frequency band in a particular mode (e.g., a frequency division duplex (FDD) mode), part of a transmission signal may leak into a path, in which a reception signal flows. The transceiver that may be highly integrated to process signals in a high-frequency band may be vulnerable to leakage signals. Accordingly, the reception performance of the transceiver may degrade.

SUMMARY

The present disclosure provides a current-to-voltage converter, which performs a filtering operation minimizing the influence of a leakage of a transmission signal on a reception signal in a transceiver and includes a filter circuit occupying a small area, a transceiver including the current-to-voltage converter, and a wireless communication device including the transceiver.

According to an aspect of the present disclosure, a current-to-voltage converter for converting a current signal into a voltage signal is provided. The current-to-voltage converter includes a transimpedance amplifier, a first filter circuit coupled between an input node of the transimpedance amplifier and an internal node of the transimpedance amplifier, and a second filter circuit coupled between the input node of the transimpedance amplifier and an output node of the transimpedance amplifier. The first filter circuit is configured to operate as a low-pass filter with respect to the current signal. The second filter circuit is configured to operate as a band-pass filter with respect to the current signal.

According to an aspect of the present disclosure, a transceiver is provided. The transceiver includes a receiver circuit and a transmitter circuit. The receiver circuit is configured to frequency down-convert a first reception signal in a first radio frequency (RF) band, and output a second reception signal in a baseband. The transmitter circuit is configured to frequency up-convert a first transmission signal in the baseband, and output a second transmission signal in a second RF band. The receiver circuit includes a current-to-voltage converter configured to convert a current signal corresponding to the first reception signal into a voltage signal corresponding to the second reception signal. The current-to-voltage converter includes a transimpedance amplifier and a first filter circuit coupled between an input node of the transimpedance amplifier and an internal node of the transimpedance amplifier. The first filter circuit is configured to operate as a low-pass filter with respect to the current signal corresponding to the first reception signal.

According to an aspect of the present disclosure, a wireless communication device is provided. The wireless communication device includes a first transceiver that includes a first transmitter circuit and a first receiver circuit, a second transceiver that includes a second transmitter circuit and a second receiver circuit, and a baseband processor. The baseband processor is configured to process reception signals provided from the first transceiver and the second transceiver, and process transmission signals to be provided to the first transceiver and the second transceiver. The first receiver circuit includes a current-to-voltage converter that includes a transimpedance amplifier and a first filter circuit between an input node of the transimpedance amplifier and an internal node of the transimpedance amplifier. The first filter circuit is configured to operate as a low-pass filter with respect to a current signal input to the transimpedance amplifier. The baseband processor is further configured to generate a control signal that adjusts a cutoff frequency of the low-pass filter of the first filter circuit.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following detailed description taken in conjunction with the accompanying drawings in which.

DETAILED DESCRIPTION

Figure 1:
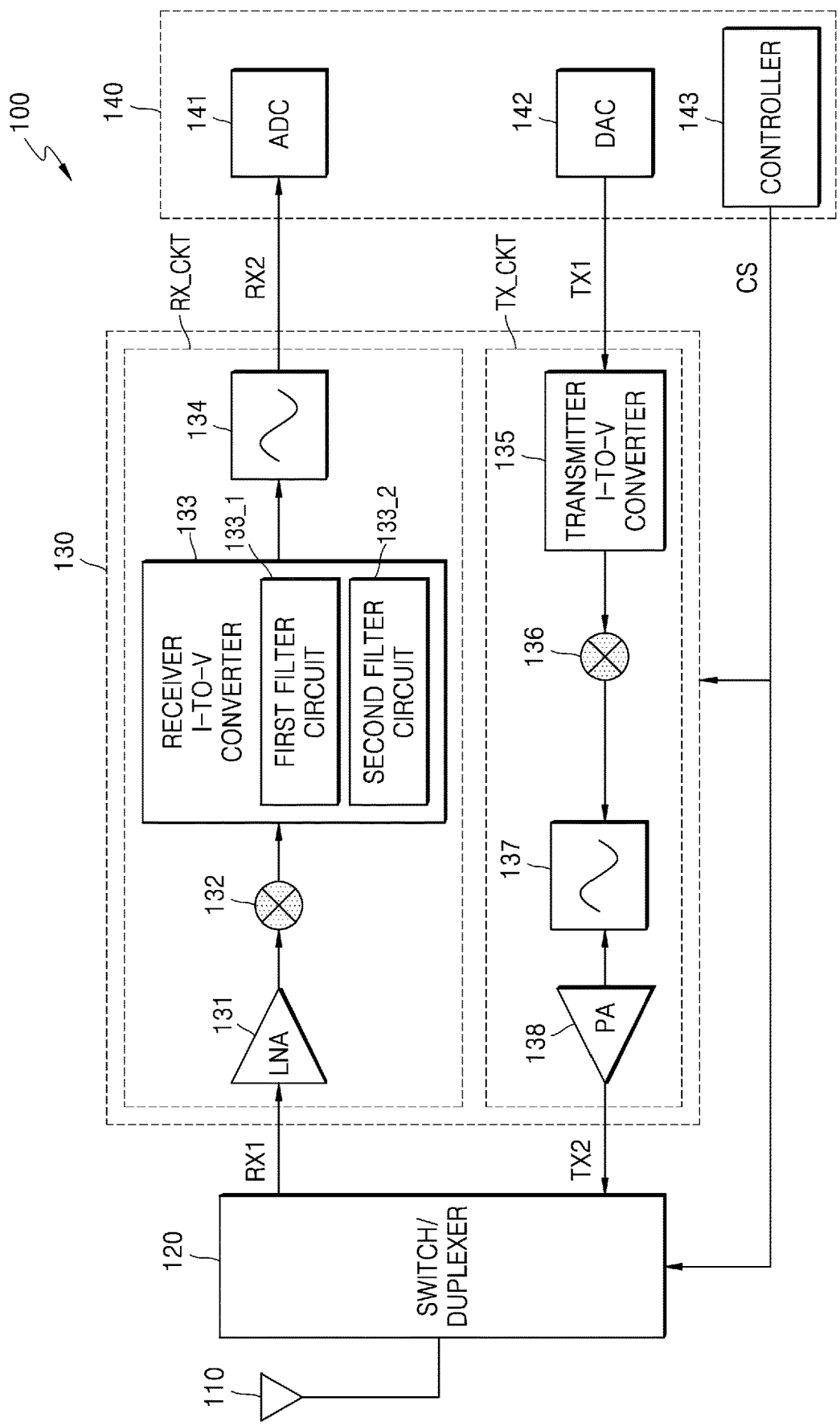
FIG. 1 is a diagram of a wireless communication device, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

FIG. 1 is a diagram of a wireless communication device 100, according to an embodiment.

A wireless communication system, in which the wireless communication device 100 communicates with another device (not shown), may correspond to a wireless communication system, such as, but not limited to, a next generation wireless system, a fifth generation (5G) wireless system, a long term evolution (LTE) system, an LTE advanced (LTE-A) system, a code division multiple access (CDMA) system, or a global system for mobile communication (GSM) system, using a cellular network. Hereinafter, a wireless communication system is assumed to refer to a 5G wireless system as described below, however, the present disclosure is not limited in this regard.

Referring to FIG. 1, the wireless communication device 100 may include an antenna 110, a switch/duplexer 120, a transceiver 130, and a baseband processor 140. The switch/duplexer 120 may provide a signal, which may have been received through the antenna 110, to the transceiver 130 as a first reception signal RX1. Alternatively or additionally, the switch/duplexer 120 may provide a second transmission signal TX2, which may have been received from the transceiver 130, to the antenna 110.

The transceiver 130 may include a receiver circuit RX_CKT (which may be referred to as a receiver) and a transmitter circuit TX_CKT (which may be referred to as a transmitter).

The receiver circuit RX_CKT may generate a second reception signal RX2 by processing the first reception signal RX1 received from the switch/duplexer 120 and provide the second reception signal RX2 to the baseband processor 140. To process the first reception signal RX1, the receiver circuit RX_CKT may include a low-noise amplifier (LNA) 131, a receiver mixer 132, a receiver current-to-voltage (I-to-V) converter 133, and a receiver filter 134. The LNA 131 may generate an output signal by amplifying an input signal. The receiver mixer 132 may generate an output signal in a baseband by performing frequency down-conversion of an input signal in a first radio frequency (RF) band. The receiver I-to-V converter 133 may generate an output signal corresponding to a voltage signal from an input signal corresponding to a current signal. The receiver filter 134 may generate an output signal by removing undesirable parts from an input signal.

The transmitter circuit TX_CKT may generate the second transmission signal TX2 by processing a first transmission signal TX1 received from the baseband processor 140 and provide the second transmission signal TX2 to the switch/duplexer 120. To process the first transmission signal TX1, the transmitter circuit TX_CKT may include a transmitter I-to-V converter 135, a transmitter mixer 136, a transmitter filter 137, and a power amplifier (PA) 138. The transmitter I-to-V converter 135 may generate an output signal corresponding to a voltage signal from an input signal corresponding to a current signal. The transmitter mixer 136 may generate an output signal in a second RF band by performing frequency up-conversion of an input signal. The transmitter filter 137 may generate an output signal by removing undesirable (e.g., unnecessary) parts from an input signal. The PA 138 may generate an output signal by amplifying an input signal.

In an embodiment, the receiver I-to-V converter 133 may include a first filter circuit 133_1 and a second filter circuit 133_2.

In a particular mode (e.g., a frequency division duplex (FDD) mode) of the wireless communication device 100, the receiver circuit RX_CKT and the transmitter circuit TX_CKT may simultaneously perform reception and transmission by using different RF bands, respectively. For example, the receiver circuit RX_CKT may generate the second reception signal RX2 in the baseband by processing the first reception signal RX1 in the first RF band. Alternatively or additionally, the transmitter circuit TX_CKT may generate the second transmission signal TX2 in the second RF band by processing the first transmission signal TX1 in the baseband. In some embodiments, the receiver circuit RX_CKT may generate the second reception signal RX2, and the transmitter circuit TX_CKT may generate the second transmission signal TX2 during substantially the same time (e.g., simultaneously).

In the FDD mode, a frequency distance between the first RF band and the second RF band may be referred to as a transmit/receive frequency offset. In some embodiments, in a time division duplex (TDD) mode of the wireless communication device 100, the receiver circuit RX_CKT and the transmitter circuit TX_CKT may alternately perform reception and transmission over time. As described herein, the first RF band may refer to a receiving band of the receiver circuit RX_CKT, and the second RF band may refer to a transmission band of the transmitter circuit TX_CKT. According to an embodiment, the first RF band may be the same as the second RF band. Alternatively or additionally, the first RF band may be different from the second RF band.

In some embodiments, a portion of a signal processed by the transmitter circuit TX_CKT (e.g., TX1) may leak into the receiver circuit RX_CKT when the wireless communication device 100 operates in the FDD mode and, as a result, may degrade the reception sensitivity of the receiver circuit RX_CKT, and/or cause the reception performance of the receiver circuit RX_CKT to decrease. The first filter circuit 133_1 may perform an operation of preventing the reception performance of the receiver circuit RX_CKT from decreasing.

According to an embodiment, the first filter circuit 133_1 may operate as a low-pass filter such that a signal leaking from the transmitter circuit TX_CKT is removed. Alternatively or additionally, the first filter circuit 133_1 may be implemented to occupy a small area of the wireless communication device 100 so as to potentially meet design constraints regarding a size and/or weight of the wireless communication device 100.

In an embodiment, the first filter circuit 133_1 may be implemented such that a cutoff frequency related to the operation of a low-pass filter may be adjusted based on the bandwidth of the first RF band of the receiver circuit RX_CKT. In an optional or additional embodiment, the first filter circuit 133_1 may be implemented such that the cutoff frequency related to the operation of the low-pass filter may be adjusted based on a transmit/receive frequency offset between the first RF band of the receiver circuit RX_CKT and the second RF band of the transmitter circuit TX_CKT. The adjustment of the cutoff frequency of the first filter circuit 133_1 is described below with reference to FIGS. 7-10.

The second filter circuit 133_2 may operate as a bandpass filter having a bandwidth corresponding to the first RF band. For example, the second filter circuit 133_2 may pass (e.g., output) only a component corresponding to the first reception signal RX1 by filtering an input signal.

In an embodiment, the first filter circuit 133_1 may be deactivated when signal leakage from the transmitter circuit TX_CKT is slight (e.g., small) and/or substantially insignificant (e.g., when the transmitter circuit TX_CKT is deactivated). That is, the first filter circuit 133_1 may be selectively activated when there is a need of removing a signal leakage. Alternatively or additionally, the first filter circuit 133_1 may be selectively deactivated when there is the need of removing the signal leakage is not present. A condition for activation of the first filter circuit 133_1 is described below with reference to FIGS. 11A and 11B.

In an embodiment, the baseband processor 140 may include an analog-to-digital converter (ADC) 141, a digital-to-analog converter (DAC) 142, and a controller 143. The ADC 141 may convert the second reception signal RX2 into a digital signal. For example, information may be extracted from the digital signal by performing digital processing on the digital signal, such as, but not limited to, filtering, demodulation, and/or decoding. The DAC 142 may generate the first transmission signal TX1 by performing digital processing on a to-be-transmitted digital signal, such as, but not limited to, filtering, modulation, and/or encoding, and output the first transmission signal TX1.

The controller 143 may provide a control signal CS to the transceiver 130 and the switch/duplexer 120. For example, the controller 143 may generate the control signal CS for controlling the transceiver 130 and the switch/duplexer 120 according to the FDD mode and/or the TDD mode. In an embodiment, the control signal CS may include signals for controlling the first filter circuit 133_1 and the second filter circuit 133_2. For example, the control signal CS may include a first control signal (e.g., a coarse control signal, not shown) for adjusting the cutoff frequency of the first filter circuit 133_1 and a second control signal (e.g., a fine control signal, not shown) for adjusting the bandwidth of the second filter circuit 133_2. The control signal CS is further described with reference to FIG. 5.

Although FIG. 1 has been described focusing on the case where a signal leaks from the transmitter circuit TX_CKT to the receiver circuit RX_CKT in the transceiver 130, embodiments of the present disclosure are not limited in this regard. For example, the present disclosure may also be applied to the case where a signal leaks from another transceiver (not shown) into the receiver circuit RX_CKT.

In the wireless communication device 100, according to an embodiment, the receiver circuit RX_CKT may remove a signal leaking from the transmitter circuit TX_CKT and include the first filter circuit 133_1, thereby potentially increasing the reception performance of the wireless communication device 100. Alternatively or additionally, the receiver circuit RX_CKT may potentially meet design constraints regarding a size and/or weight of the wireless communication device 100.

Figure 2:
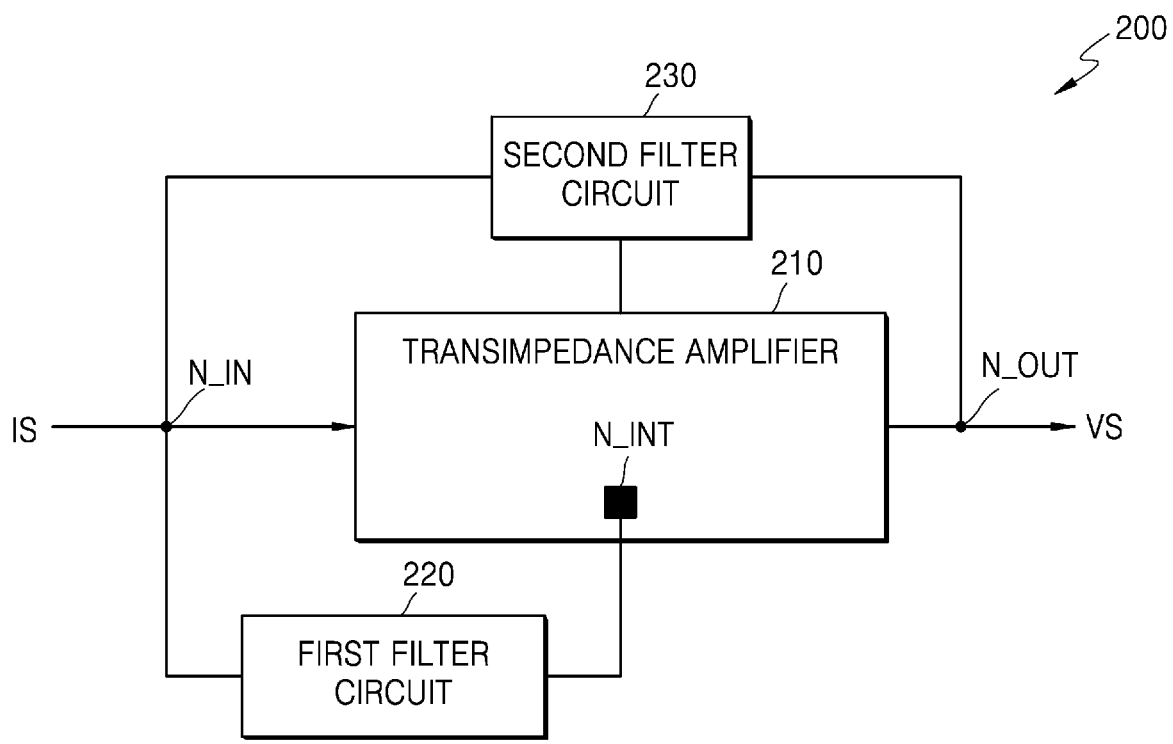
FIG. 2 is a schematic block diagram of a current-to-voltage converter, according to an embodiment.

FIG. 2 is a schematic block diagram of an I-to-V converter 200, according to an embodiment. The I-to-V converter 200 of FIG. 2 is an example implementation of the receiver I-to-V converter 133 of FIG. 1. That is, the I-to-V converter 200 of FIG. 2 may include or may be similar in many respects to the receiver I-to-V converter 133 of FIG. 1, and may include additional features not mentioned above.

Referring to FIG. 2, the I-to-V converter 200 may include a transimpedance amplifier 210, a first filter circuit 220, and a second filter circuit 230.

In an embodiment, the transimpedance amplifier 210 may convert a current signal IS into a voltage signal VS, based on a power supply voltage (not shown). The transimpedance amplifier 210 may include a plurality of amplification stages and sequentially perform a plurality of amplification operations. For example, the transimpedance amplifier 210 may include a plurality of amplifiers, which may be connected in series to each other and configured to sequentially perform amplification. In an optional or additional embodiment, an internal node N_INT of the transimpedance amplifier 210 may connect an output terminal of one of the amplifiers to an input terminal of another one of the amplifiers. In other optional or additional embodiments, the internal node N_INT connected to the first filter circuit 220 may be changed according to the gain of the amplifiers of the transimpedance amplifier 210.

In an embodiment, the second filter circuit 230 may be connected between an input node N_IN and an output node N_OUT of the transimpedance amplifier 210 and may operate as a band-pass filter with respect to the current signal IS.

In an embodiment, the first filter circuit 220 may be connected between the input node N_IN and the internal node N_INT of the transimpedance amplifier 210 and may operate as a low-pass filter with respect to the current signal IS. For example, the first filter circuit 220 may operate as a low-pass filter, which may remove a signal leaking from the outside (e.g., the transmitter circuit TX_CKT in FIG. 1), such that the amplifiers of the transimpedance amplifier 210 operate in a non-saturated region. The first filter circuit 220 may be connected between the input node N_IN and the internal node N_INT of the transimpedance amplifier 210 and may thus decrease its influence on bandwidth adjustment related to the operation of a band-pass filter of the second filter circuit 230. Alternatively or additionally, the first filter circuit 220 may provide, with a small design area, a large equivalent capacitance for the I-to-V converter 200. Equivalent capacitance is described below with reference to FIG. 3A.

As described herein, a cutoff frequency related to the operation of a low-pass filter of the first filter circuit 220 may be referred to as a cutoff frequency of the first filter circuit 220, and a bandwidth related to the operation of a band-pass filter of the second filter circuit 230 may be referred to as a bandwidth of the second filter circuit 230.

Figure 3A:
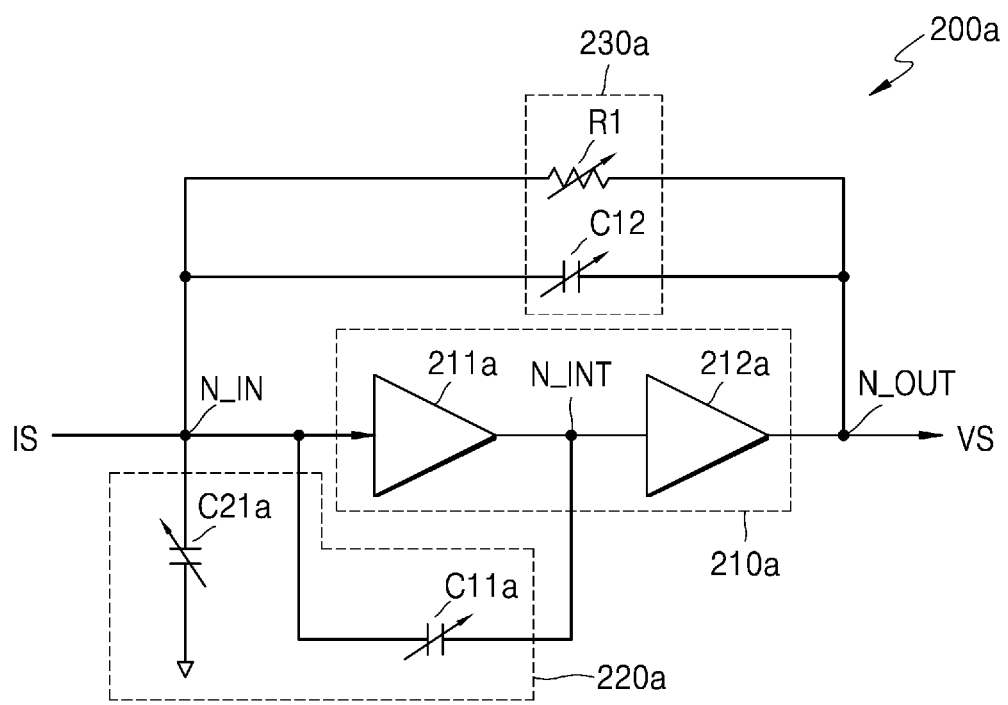
FIGS. 3A to 3C illustrate exemplary circuit diagrams of the current-to-voltage converter of FIG. 2, according to embodiments.
Figure 3B:
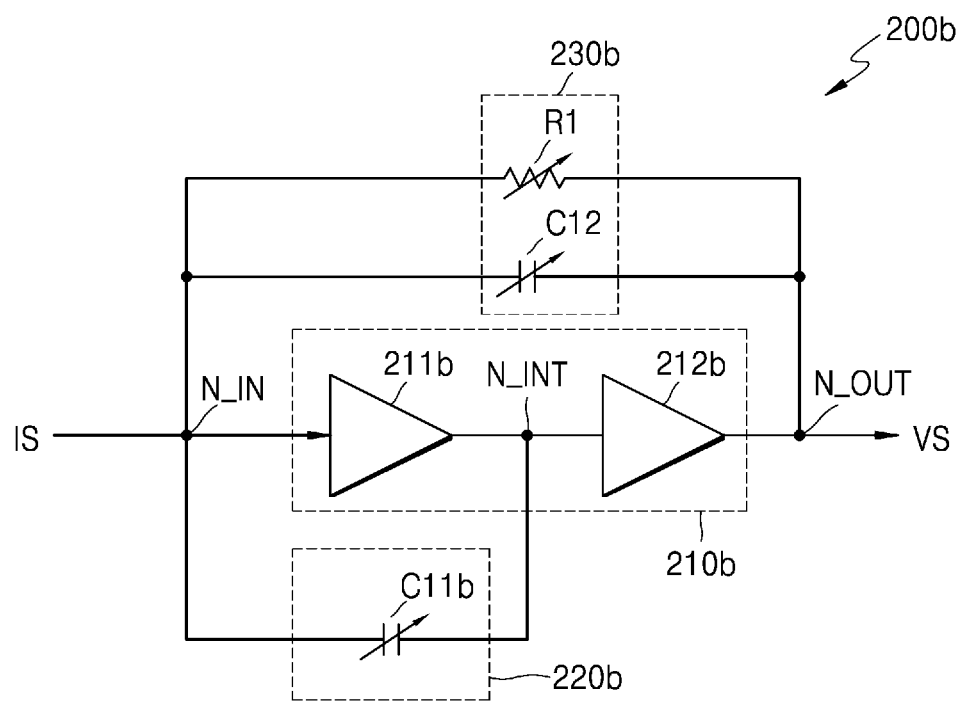
Figure 3C:
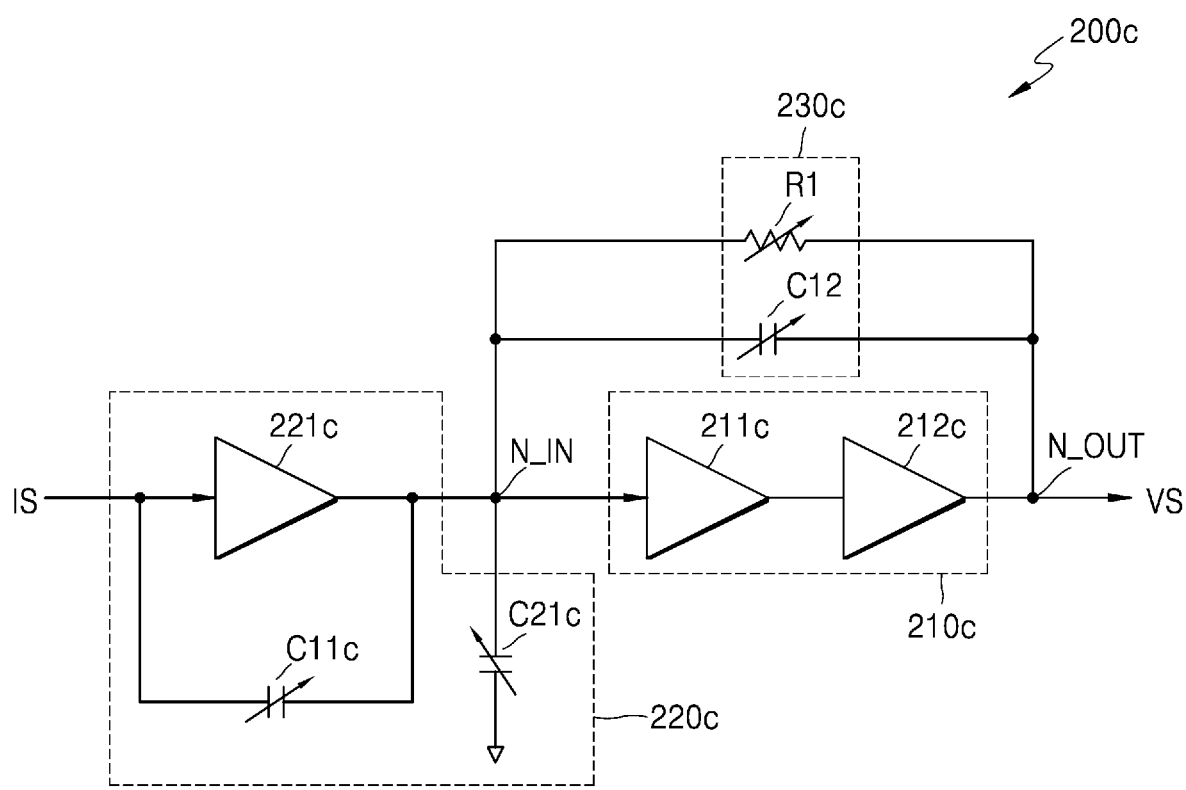

FIGS. 3A to 3C illustrate exemplary circuit diagrams of the I-to-V converter 200 of FIG. 2, according to various embodiments.

Referring to FIG. 3A, an I-to-V converter 200a may include a transimpedance amplifier 210a, a first filter circuit 220a, and a second filter circuit 230a.

In an embodiment, the transimpedance amplifier 210a may include a first amplifier 211a and a second amplifier 212a, which may be connected in series to each other. That is, the transimpedance amplifier 210a may include two amplification stages. An output terminal of the first amplifier 211a may be connected to an input terminal of the second amplifier 212a through the internal node N_INT. In an embodiment, the gain of the first amplifier 211a may be the same as the gain of the second amplifier 212a. In another embodiment, the gain of the first amplifier 211a may be different from the gain of the second amplifier 212a.

In an embodiment, the first filter circuit 220a may include a first variable capacitor C11a and a second variable capacitor C21a. A terminal of the first variable capacitor C11a may be connected to the input node N_IN, and an opposite terminal of the first variable capacitor C11a may be connected to the internal node N_INT. A terminal of the second variable capacitor C21a may be connected to the input node N_IN, and an opposite terminal the second variable capacitor C21a may be grounded.

Based on the input side of the transimpedance amplifier 210a, the equivalent capacitance, $E.Cap_{C11}$, of the first variable capacitor C11a may be determined using Equation 1, for example.

$$E.Cap_{C11} = (1 + A_{1st}) \times Cap_{C11} \qquad \text{[Equation 1]}$$

Referring to Equation 1, the equivalent capacitance, $E.Cap_{C11}$, may be represented as the product of the sum of the gain, $A_{1st}$, of the first amplifier 211a and one (1) and the capacitance, $Cap_{C11}$, of the first variable capacitor C11a.

A cutoff frequency of the first filter circuit 220a operating as a low-pass filter may be determined using Equation 2, for example.

$$f_c = \frac{1}{2\pi R \cdot (Cap_{C21} + E.Cap_{C11})} \qquad \text{[Equation 2]}$$

Referring to Equation 2, the cutoff frequency, $f_c$, may be represented as the product of the sum of the capacitance, $Cap_{C21}$, of the second variable capacitor C21a and the equivalent capacitance, $E.Cap_{C11}$, and a resistance, R, at the input terminal of the first amplifier 211a. The resistance, R, may be measured by a parasitic component or the like, and the actual magnitude thereof may be very small. Accordingly, the I-to-V converter 200a may be designed such that the sum of the capacitance, $Cap_{C21}$, of the second variable capacitor C21a and the equivalent capacitance, $E.Cap_{C11}$, has an appropriate magnitude to secure a certain magnitude of cutoff frequency, $f_c$. In some embodiments, the design of the I-to-V converter 200a may be constrained because as the capacitance of a capacitor increases, so does the area of the capacitor (e.g., size). However, as described above, such a design constraint may be decreased via the equivalent capacitance, $E.Cap_{C11}$, provided by the first variable capacitor C11a.

In an embodiment, the capacitance of the first variable capacitor C11a and the capacitance of the second variable capacitor C21a may be changed according to a target cutoff frequency. For example, the capacitance of the first variable capacitor C11a may be changed for the coarse adjustment of a cutoff frequency, and the capacitance of the second variable capacitor C21a may be changed for the fine adjustment of a cutoff frequency.

In an embodiment, a resulting cutoff frequency corresponding to a certain capacitance of the first variable capacitor C11a and a certain capacitance of the second variable capacitor C21a may be learned in advance. Consequently, a control signal for changing the capacitance of each of the first variable capacitor C11a and the second variable capacitor C21a according to a target cutoff frequency may be generated based on a result of the learning.

In an embodiment, the configuration of the first variable capacitor C11a may be the same as that of the second variable capacitor C21a. That is, the first and second variable capacitors C11a and C21a may have the same configuration. Alternatively or additionally, opposite terminals of the first variable capacitor C11a may be connected to different nodes than opposite terminals of the second variable capacitor C21a are connected. In optional or additional embodiments, the configuration of the first variable capacitor C11a may be different from the configuration of the second variable capacitor C21a.

In some embodiments, a second filter circuit 230b may include a third variable capacitor C12 and a variable resistor R1 connected in parallel between the input node N_IN and the output node N_OUT.

Referring to FIG. 3B, an I-to-V converter 200b may include a transimpedance amplifier 210b, a first filter circuit 220b, and the second filter circuit 230b. The I-to-V converter 200b of FIG. 3B may include or may be similar in many respects to the I-to-V converter 200a of FIG. 3A, and may include additional features not mentioned above. Some of the elements of the I-to-V converter 200b described above have been omitted for the sake of simplicity.

Compared to the first filter circuit 220a in FIG. 3A, the first filter circuit 220b in FIG. 3B may include only a first variable capacitor C11b. Consequently, a cutoff frequency of the first filter circuit 220b operating as a low-pass filter may be determined using Equation 3, for example.

$$f_c = \frac{1}{2\pi R \cdot (E.Cap_{C11})}$$ [Equation 3]

Referring to Equation 3, the cutoff frequency, $f_c$, may be represented as the product of the equivalent capacitance, $E.Cap_{C11}$, of the first variable capacitor C11b and a resistance, R, at the input terminal of a first amplifier 211b of the transimpedance amplifier 210b.

Referring further to FIG. 3C, an I-to-V converter 200c may include a transimpedance amplifier 210c, a first filter circuit 220c, and a second filter circuit 230c. The I-to-V converter 200c of FIG. 3C may include or may be similar in many respects to at least one of the I-to-V converters 200a and 200b of FIGS. 3A and 3B, and may include additional features not mentioned above. Some of the elements of the I-to-V converter 200c described above have been omitted for the sake of simplicity.

Compared to the first filter circuit 220a in FIG. 3A, the first filter circuit 220c in FIG. 3C may include an additional amplifier 221c, a first variable capacitor C11c, and a second variable capacitor C21c.

Compared the first filter circuit 220a in FIG. 3A and the first filter circuit 220b in FIG. 3B, the first filter circuit 220c may not be connected to the internal node N_INT in FIGS. 3A and 3B. For example, the first variable capacitor C11c may be connected in parallel to the additional amplifier 221c, a terminal of the second variable capacitor C21c may be connected to the input node N_IN, and an opposite terminal of the second variable capacitor C21c may be grounded.

The first filter circuit 220c may be connected to an input terminal of the transimpedance amplifier 210c and further perform an amplification operation together with the operation of a low-pass filter. The first filter circuit 220c and the transimpedance amplifier 210c may form a plurality of amplification stages.

Figure 4:
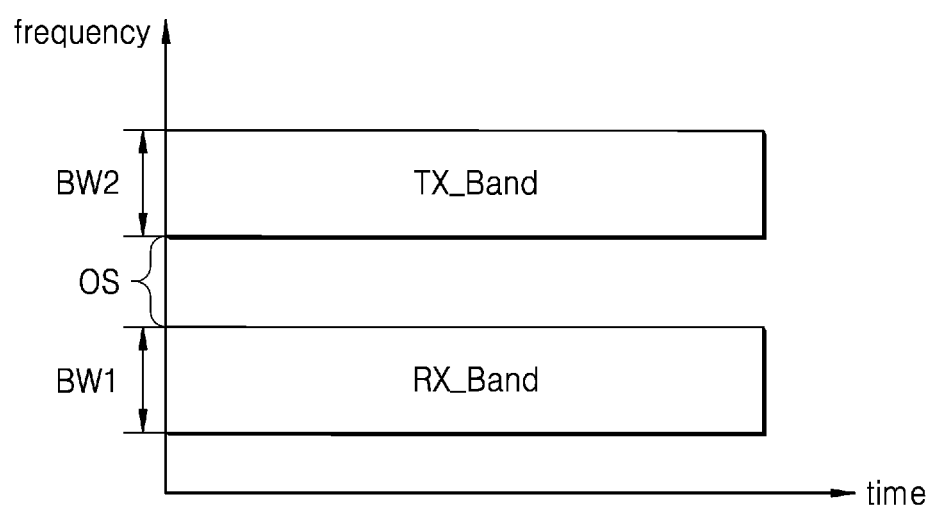
FIG. 4 is a diagram illustrating a transmit/receive frequency offset, based on which a first filter circuit is controlled, according to an embodiment.

FIG. 4 is a diagram illustrating a transmit/receive frequency offset, based on which a first filter circuit is controlled, according to an embodiment.

Referring to FIG. 4, when a wireless communication device (e.g., wireless communication device 100 of FIG. 1) operates in the FDD mode, the wireless communication device 100 may receive a signal by using a receiving band RX_Band having a first bandwidth BW1 and simultaneously (e.g., at substantially the same time) transmit a signal by using a transmission band TX_Band having a second bandwidth BW2.

A transmit/receive frequency offset OS may correspond to a frequency distance between the receiving band RX_Band and the transmission band TX_Band. Although the difference between the highest frequency of the receiving band RX_Band and the lowest frequency of the transmission band TX_Band is referred to as the transmit/receive frequency offset OS in FIG. 4, this is just an example, and embodiments of the present disclosure are not limited in this regard. For example, the transmit/receive frequency offset OS may be variously defined to quantitatively express the frequency distance between the receiving band RX_Band and the transmission band TX_Band.

In an embodiment, a cutoff frequency related to the operation of a low-pass filter of a first filter circuit may be adjusted based on the transmit/receive frequency offset OS. For example, the cutoff frequency may be decreased when the transmit/receive frequency offset OS is decreased and/or the cutoff frequency may be increased when the transmit/receive frequency offset OS is increased. Alternatively or additionally, the cutoff frequency may be decreased when the transmit/receive frequency offset OS is increased and/or the cutoff frequency may be increased when the transmit/receive frequency offset OS is decreased.

Figure 5:
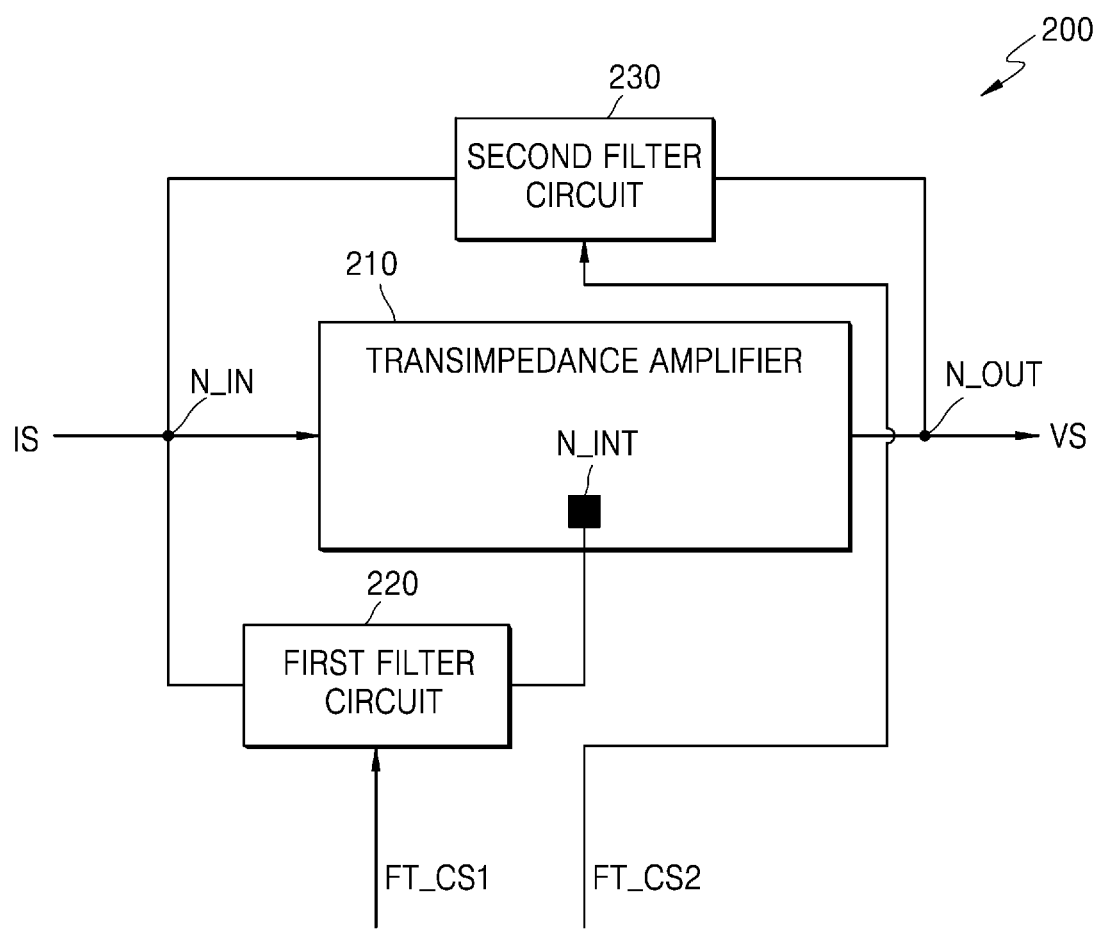
FIG. 5 is a block diagram of a current-to-voltage converter used to describe a control method, according to an embodiment.

FIG. 5 is a block diagram of the I-to-V converter 200 used to describe a control method, according to an embodiment. The I-to-V converter 200 of FIG. 5 may include or may be similar in many respects to the I-to-V converter 200 of FIG. 2 and may include additional features not mentioned above. Some of the elements of the I-to-V converter 200 described above have been omitted for the sake of simplicity.

Referring to FIG. 5, the I-to-V converter 200 may include the transimpedance amplifier 210, the first filter circuit 220, and the second filter circuit 230.

In an embodiment, the first filter circuit 220 may receive a first control signal FT_CS1 from the outside (e.g., the controller 143 in FIG. 1) and adjust a cutoff frequency related to the operation of a low-pass filter based on the first control signal FT_CS1.

In an embodiment, the second filter circuit 230 may receive a second control signal FT_CS2 from the outside (e.g., the controller 143 in FIG. 1) and adjust a bandwidth related to the operation of a band-pass filter based on the second control signal FT_CS2.

In an embodiment, the bandwidth related to the operation of the band-pass filter of the second filter circuit 230 may be adjusted to correspond to the bandwidth of the first RF band that is the frequency band of a signal received by a receiver circuit including the I-to-V converter 200. That is, the bandwidth of the first RF band may vary with a communication environment, a communication resource configuration, or the like, and a bandwidth related to the operation of the band-pass filter of the second filter circuit 230 may be adjusted to the changed bandwidth of the first RF band.

In an embodiment, a cutoff frequency related to the operation of a low-pass filter of the first filter circuit 220 may be adjusted to correspond to a bandwidth related to the operation of the band-pass filter of the second filter circuit 230. That is, in a manner similar to the adjustment of the bandwidth of the second filter circuit 230, the cutoff frequency of the first filter circuit 220 may be adjusted to correspond to the bandwidth of the first RF band.

In an embodiment, each of the first control signal FT_CS1 and the second control signal FT_CS2 may include a bit signal including a plurality of bits.

Figure 6:
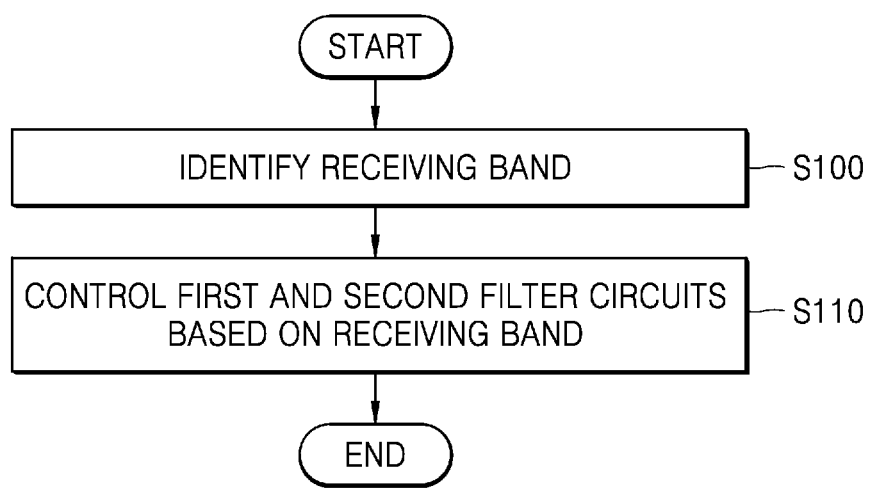
FIG. 6 is a flowchart of an operating method of a wireless communication device, according to an embodiment.
Figure 7:
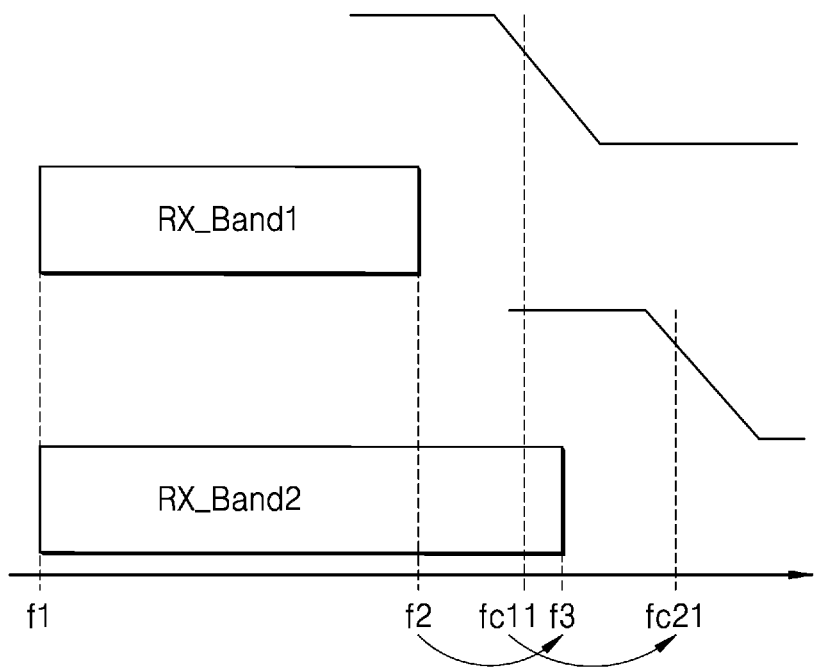
FIG. 7 is a diagram illustrating a method of adjusting the cutoff frequency of a first filter circuit of the wireless communication device, according to an embodiment.

FIG. 6 is a flowchart of an operating method of a wireless communication device, according to an embodiment. FIG. 7 is a diagram illustrating a method of adjusting the cutoff frequency of a first filter circuit of the wireless communication device, according to an embodiment.

Referring to FIG. 6, the wireless communication device (e.g., wireless communication device 100 of FIG. 1) may identify a receiving band of a current reception signal in operation S100. In an embodiment, the wireless communication device 100 may receive, from another device (e.g., a base station), control information about resources that may have been scheduled to allow the wireless communication device 100 to receive a signal. In some embodiments, the wireless communication device 100 may identify the receiving band based on the control information.

The wireless communication device 100 may control a first filter circuit 220 and a second filter circuit 230 based on the receiving band in operation S110. In an embodiment, the wireless communication device 100 may adjust the bandwidth of the second filter circuit 230 based on the bandwidth of the receiving band. Alternatively or additionally, the wireless communication device 100 may adjust the cutoff frequency of the first filter circuit 220 based on the bandwidth of the receiving band.

Referring to FIG. 7, a first receiving band RX_Band1 may include a band from a first frequency f1 to a second frequency f2. When the wireless communication device 100 currently receives a signal through the first receiving band RX_Band1, the wireless communication device 100 may adjust the cutoff frequency of the first filter circuit 220 to a first cutoff frequency fc11 in correspondence to the bandwidth of the first receiving band RX_Band1.

A second receiving band RX_Band2 may include a band from the first frequency f1 to a third frequency f3. When the wireless communication device 100 currently receives a signal through the second receiving band RX_Band2, the wireless communication device 100 may adjust the cutoff frequency of the first filter circuit 220 to a second cutoff frequency fc21 in correspondence to the bandwidth of the second receiving band RX_Band2.

In an embodiment, the wireless communication device 100 may increase the cutoff frequency when the bandwidth of a receiving band increases. However, this is just an example, and embodiments of the present disclosure are not limited in this regard. For example, the wireless communication device 100 may adjust the cutoff frequency of the first filter circuit 220 in various manners based on the bandwidth of a receiving band.

Although not shown in FIG. 7, the wireless communication device 100 may adjust the bandwidth of the second filter circuit 230 to correspond to the bandwidth of the first receiving band RX_Band1 and/or the second receiving band RX_Band2.

Figure 8:
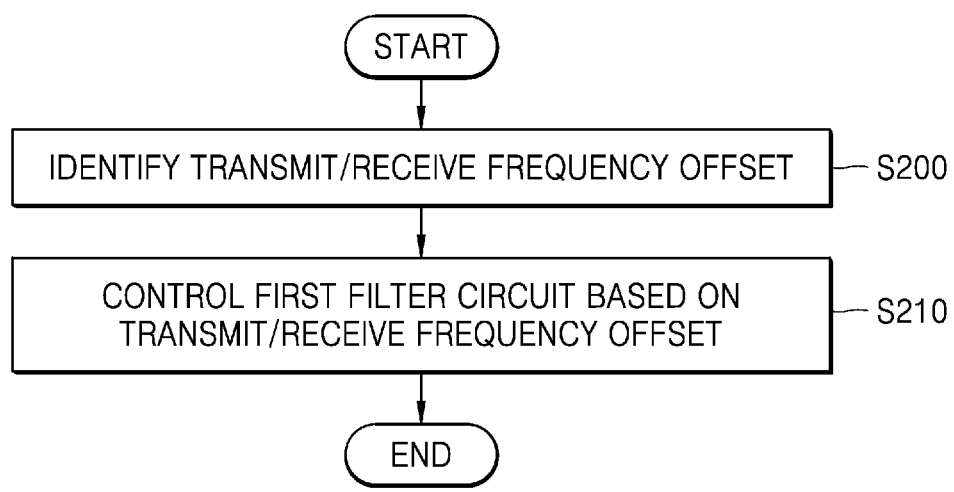
FIG. 8 is a flowchart of an operating method of a wireless communication device, according to an embodiment.
Figure 9:
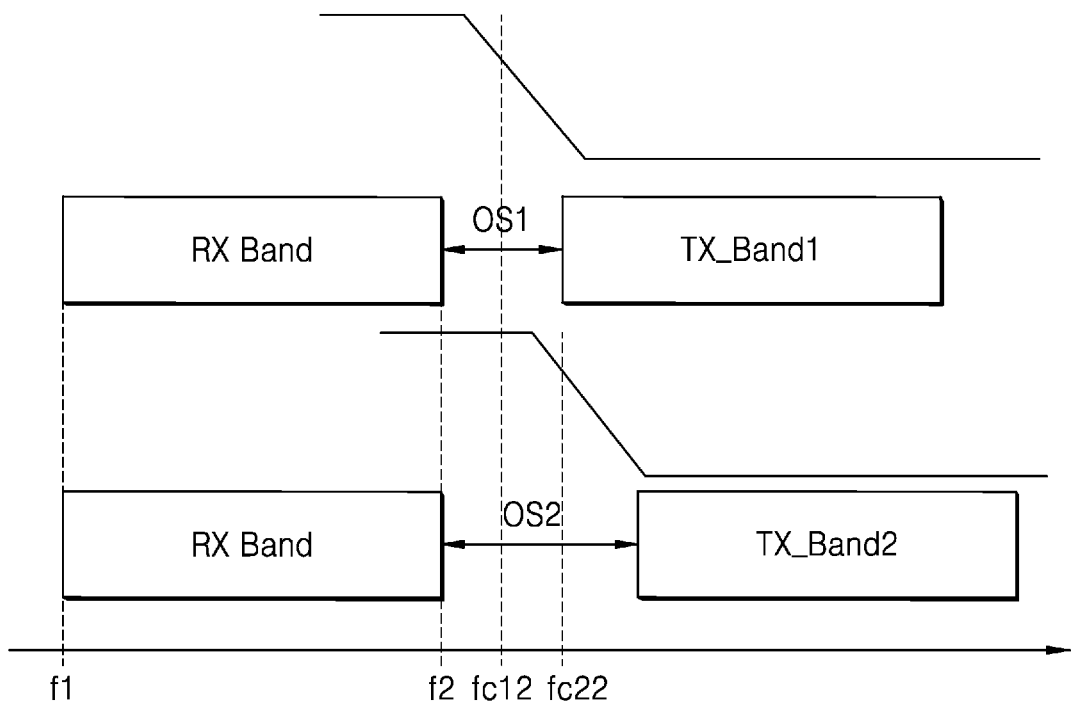
FIG. 9 is a diagram illustrating a method of adjusting the cutoff frequency of a first filter circuit of the wireless communication device, according to an embodiment.

FIG. 8 is a flowchart of an operating method of a wireless communication device, according to an embodiment. FIG. 9 is a diagram illustrating a method of adjusting the cutoff frequency of a first filter circuit of the wireless communication device, according to an embodiment.

Referring to FIG. 8, the wireless communication device (e.g., wireless communication device 100 of FIG. 1) may identify a transmit/receive frequency offset corresponding to the frequency distance between a receiving band and a transmission band in operation S200. In an embodiment, the wireless communication device 100 may receive, from another device (e.g., a base station), control information about resources scheduled for the wireless communication device 100 to transmit a signal and resources scheduled for the wireless communication device 100 to receive a signal. The wireless communication device 100 may identify the transmit/receive frequency offset based on the control information. In some embodiments, the wireless communication device 100 may receive, from another device (e.g., a base station), control information including information directly indicating the transmit/receive frequency offset and the wireless communication device 100 may identify the transmit/receive frequency offset directly from the control information.

The wireless communication device 100 may control the first filter circuit 220 based on the transmit/receive frequency offset in operation S210. That is, the wireless communication device 100 may quantitatively recognize the frequency distance between a transmission band and a receiving band through the transmit/receive frequency offset and thus predict whether the amount of signals leaking from a transmitter circuit to a receiver circuit is large (e.g., substantial) or small. For example, the wireless communication device 100 may determine whether a predicted amount of signal leaks exceeds a predetermined threshold (e.g., substantial) or does not exceed the predetermined threshold. In an embodiment, the wireless communication device 100 may adjust the cutoff frequency of the first filter circuit 220 to be low when the transmit/receive frequency offset is small. For example, when the wireless communication device 100 predicts that there is a large (e.g., substantial) amount of signals leaking from the transmitter circuit to the receiver circuit because the transmit/receive frequency offset is small, the wireless communication device 100 may adjust the cutoff frequency to be low such that a leakage signal may be significantly removed.

Referring to FIG. 9, the receiving band RX_Band may include a band from the first frequency f1 to the second frequency f2. When the wireless communication device 100 currently receives a signal through the receiving band RX_Band and currently transmits a signal through a first transmission band TX_Band1, the wireless communication device 100 may adjust the cutoff frequency of the first filter circuit 220 to a first cutoff frequency fc12 based on a first transmit/receive frequency offset OS1 between the receiving band RX_Band and the first transmission band TX_Band1.

When the wireless communication device 100 currently receives a signal through the receiving band RX_Band and currently transmits a signal through a second transmission band TX_Band2, the wireless communication device 100 may adjust the cutoff frequency of the first filter circuit 220 to a second cutoff frequency fc22 based on a second transmit/receive frequency offset OS2 between the receiving band RX_Band and the second transmission band TX_Band2.

In an embodiment, the wireless communication device 100 may adjust the cutoff frequency to be high when the transmit/receive frequency offset is large. However, this is just an example, and embodiments of the present disclosure are not limited in this regard. In some embodiments, the wireless communication device 100 may adjust the cutoff frequency in various manners based on the transmit/receive frequency offset.

Figure 10A:
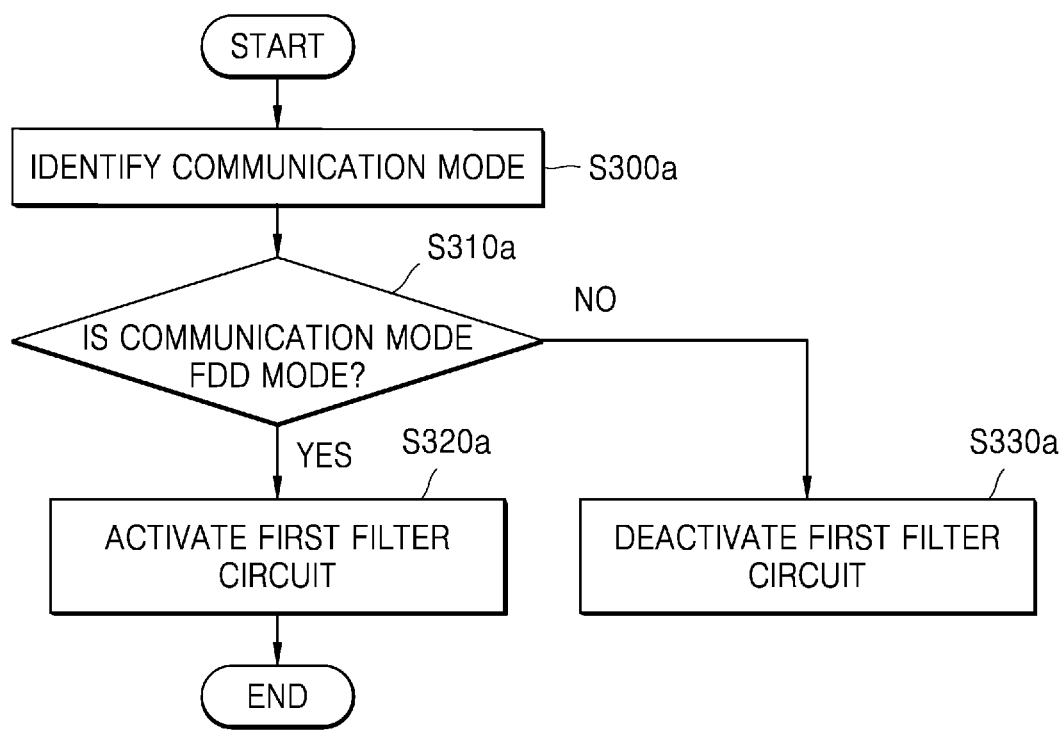
FIGS. 10A and 10B are flowcharts of an operating method of a wireless communication device, according to an embodiment.
Figure 10B:
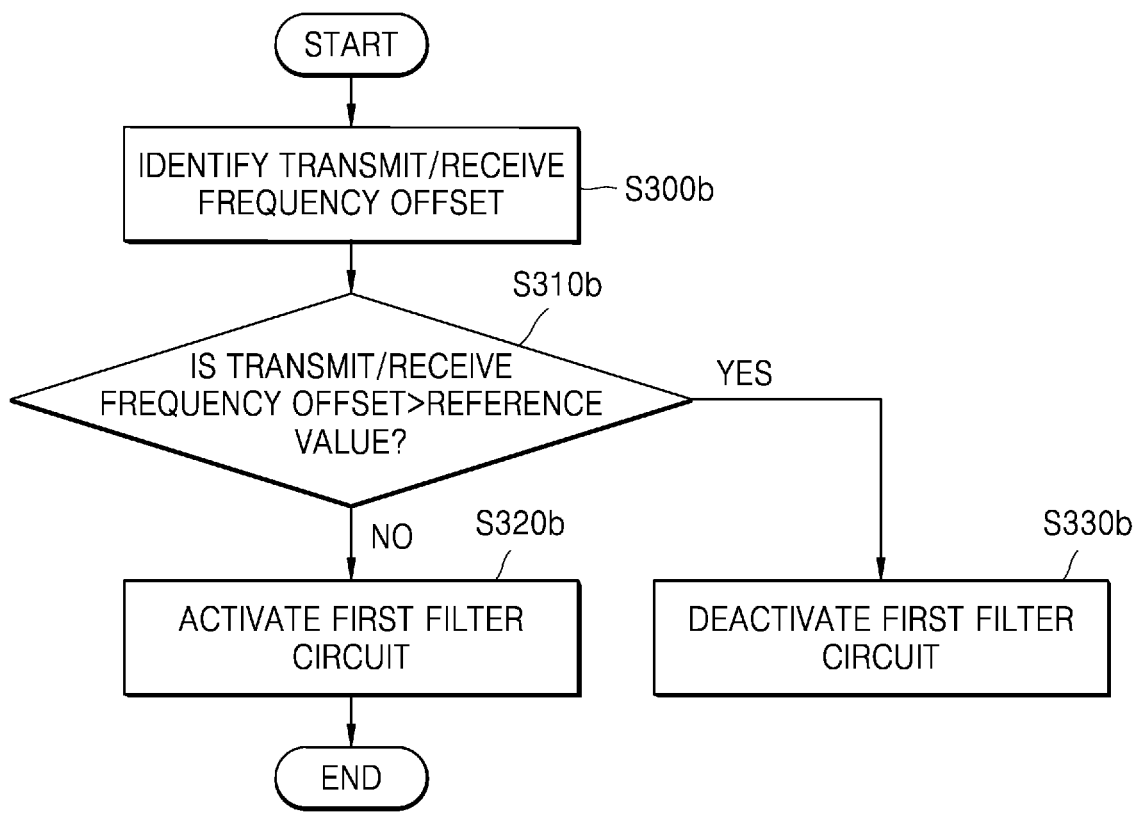

FIGS. 10A and 10B are flowcharts of an operating method of a wireless communication device, according to an embodiment.

Referring to FIG. 10A, the wireless communication device (e.g., wireless communication device 100 of FIG. 1) may identify a current communication mode in operation S300a. The communication mode may include at least one of the FDD mode and the TDD mode. However, this is just an example, and embodiments of the present disclosure are not limited in this regard. According to the present disclosure, any mode or environment, in which a signal of a circuit may partially leak into a receiver circuit that is receiving another signal, may be identified.

The wireless communication device 100 may determine whether a current communication mode is the FDD mode in operation S310a.

In case of YES in operation S310a, the wireless communication device 100 may predict that a signal partially leaks from a transmitter circuit to a receiver circuit and activate a first filter circuit 220 of the receiver circuit in operation S320a. Alternatively or additionally, the wireless communication device 100 may adjust the cutoff frequency of the activated first filter circuit 220 based on at least one of the bandwidth of a receiving band and a transmit/receive frequency offset.

In case of NO in operation S310a, the wireless communication device 100 may predict that a signal may not leak from the transmitter circuit to the receiver circuit and deactivate the first filter circuit 220 of the receiver circuit in operation S330a. Accordingly, the wireless communication device 100 may decrease unnecessary power consumption of the first filter circuit 220.

Referring further to FIG. 10B, the wireless communication device 100 may identify a current transmit/receive frequency offset in operation S300b. As described above with reference to FIG. 10A, the wireless communication device 100 may receive control information from another device (e.g., a base station) and identify the transmit/receive frequency offset from the control information.

The wireless communication device 100 may determine whether the transmit/receive frequency offset exceeds a reference value in operation S310b.

In case of NO in operation S310b, the wireless communication device 100 may activate the first filter circuit 220 of the receiving circuit in operation S320b. Alternatively or additionally, the wireless communication device 100 may adjust the cutoff frequency of the activated first filter circuit 220 based on at least one of the bandwidth of the receiving band and the transmit/receive frequency offset.

In case of YES in operation S310b, the wireless communication device 100 may predict that the amount of signals leaking from the transmitter circuit to the receiver circuit is slight (e.g., below a predetermined threshold) and deactivate the first filter circuit 220 of the receiver circuit in operation S330b. Accordingly, the wireless communication device 100 may decrease unnecessary power consumption of the first filter circuit 220.

Figure 11A:
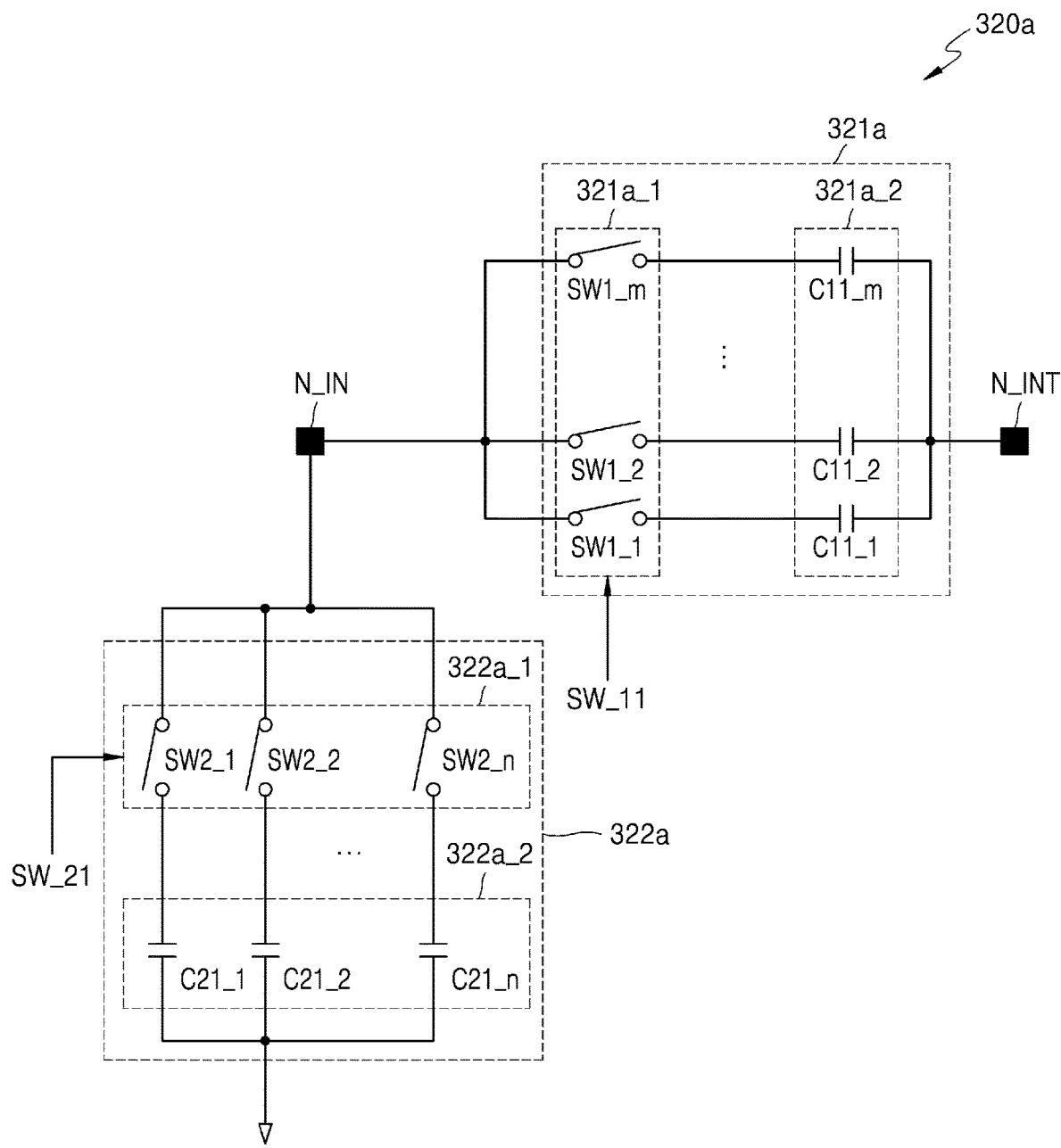
FIGS. 11A and 11B illustrate exemplary circuit diagrams of first filter circuits, according to embodiments.
Figure 11B:
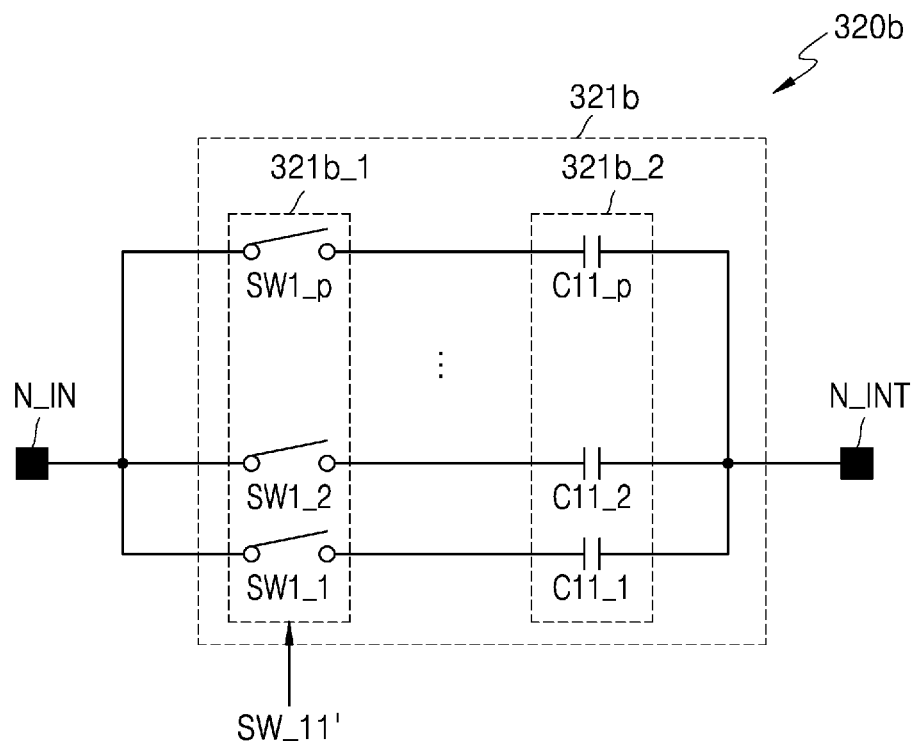

FIGS. 11A and 11B illustrate exemplary circuit diagrams of first filter circuits 320a and 320b, respectively, according to some embodiments. The first filter circuits 320a and 320b of FIGS. 11A and 11B may include or may be similar to at least one of the first filter circuits described above with reference to FIGS. 1, 2, 3A, 3B, 3C, and 5, and may include additional features not mentioned above. Some of the elements of the first filter circuits 320a and 320b described above have been omitted for the sake of simplicity.

Referring to FIG. 11A, the first filter circuit 320a may include a first variable capacitor 321a and a second variable capacitor 322a.

In an embodiment, the first variable capacitor 321a may include a first switch group 321a_1 and a first capacitor group 321a_2. The first switch group 321a_1 may include a plurality of first switches SW1_1 to SW1_$m$, and the first capacitor group 321a_2 may include a plurality of first capacitors C11_1 to C11_$m$, where m is an integer greater than zero (0). The first capacitors C11_1 to C11_$m$ may be connected in parallel to each other between the input node N_IN and the internal node N_INT. The first switches SW1_1 to SW1_$m$ may be respectively connected to the first capacitors C11_1 to C11_$m$ and may be turned (e.g., switched) on or off in response to a first switch signal SW_11. That is, the capacitance of the first variable capacitor 321a may be changed based on the first switch signal SW_11.

In an embodiment, the second variable capacitor 322a may include a second switch group 322a_1 and a second capacitor group 322a_2. The second switch group 322a_1 may include a plurality of second switches SW2_1 to SW2_$n$, and the second capacitor group 322a_2 may include a plurality of second capacitors C21_1 to C21_$n$, where n is an integer greater than zero (0). The second capacitors C21_1 to C21_$n$ may be connected in parallel to each other between the input node N_IN and the ground. The second switches SW2_1 to SW2_$n$ may be respectively connected to the second capacitors C21_1 to C21_$n$ and may be turned (e.g., switch) on or off in response to a second switch signal SW_21. That is, the capacitance of the second variable capacitor 322a may be changed based on the second switch signal SW_21.

In an embodiment, the number of first capacitors C11_1 to C11_$m$ may be the same as or different from the number of second capacitors C21_1 to C21_$n$. That is, m may be equal to or different from n.

Although it is illustrated in FIG. 11A that a variable capacitor includes a plurality of capacitors and a plurality of switches, this is just an example, and embodiments of the present disclosure are not limited in this regard. That is, the variable capacitors 321a and 322a may be implemented in various manners that change the capacitance of the variable capacitor based on a received signal.

Referring to FIG. 11B, the first filter circuit 320b may include only a first variable capacitor 321b.

In an embodiment, the first variable capacitor 321b may include a first switch group 321b_1 and a first capacitor group 321b_2. The first switch group 321b_1 may include a plurality of first switches SW_11 to SW1_$p$, and the first capacitor group 321b_2 may include a plurality of first capacitors C11_1 to C11_$p$, where p is an integer greater than zero (0). The first capacitors C11_1 to C11_$p$ may be connected in parallel to each other between the input node N_IN and the internal node N_INT. The first switches SW1_1 to SW1_$p$ may be respectively connected to the first capacitors C11_1 to C11_$p$ and may be turned (e.g., switched) on or off in response to a first switch signal SW_11'. That is, the capacitance of the first variable capacitor 321b may be changed based on the first switch signal SW_11'.

In an embodiment, the first variable capacitor 321b may include more capacitors and more switches than the first variable capacitor 321a in FIG. 11A. Alternatively or additionally, the first variable capacitor 321b may include the same number of capacitors and switches as the first variable capacitor 321*a* in FIG. 11A. In an optional or additional embodiment, the first variable capacitor 321*b* may include less capacitors and less switches than the first variable capacitor 321*a* in FIG. 11A. That is, in some embodiments, p may be greater than m (e.g., p>m), p may be equal to m, and/or p may be less than m (e.g., p<m).

In an embodiment, the capacitance of the first variable capacitor 321*b* may be changed to more various values, when compared to the first variable capacitor 321*a* in FIG. 11A. That is, a range of possible capacitance values of the first variable capacitor 321*b* may be different from the range of possible capacitance values of the first variable capacitor 321*a*.

Figure 12:
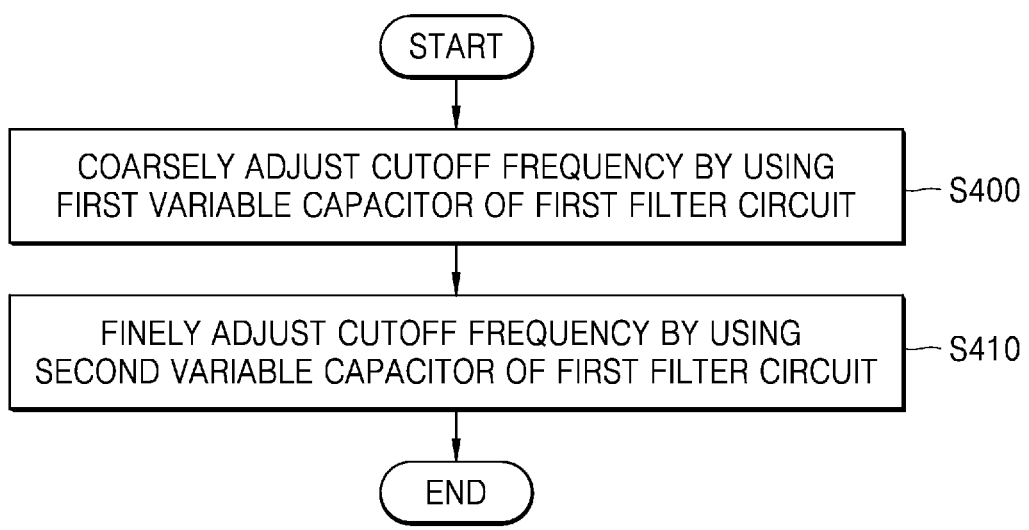
FIG. 12 is a flowchart of an operating method of a wireless communication device, according to an embodiment.

FIG. 12 is a flowchart of an operating method of a wireless communication device, according to an embodiment.

Referring to FIG. 12, the wireless communication device (e.g., wireless communication device 100 of FIG. 1) may coarsely adjust the cutoff frequency of a first filter circuit (e.g., first filter circuit 220*a* of FIG. 3A) by using a first variable capacitor (e.g., first variable capacitor C11*a* of FIG. 3A) of the first filter circuit 220*a* in operation S400. As described above with reference to FIG. 3A, because the first variable capacitor C11*a* of the first filter circuit 220*a* provides equivalent capacitance greater than the actual capacitance of the first variable capacitor C11*a*, coarse adjustment of the cutoff frequency may be performed by changing the capacitance of the first variable capacitor C11*a*.

The wireless communication device 100 may finely adjust the cutoff frequency of the first filter circuit 220*a* by using a second variable capacitor (e.g., second variable capacitor C21*a* of FIG. 3A) of the first filter circuit 220*a* in operation S410.

Figure 13A:
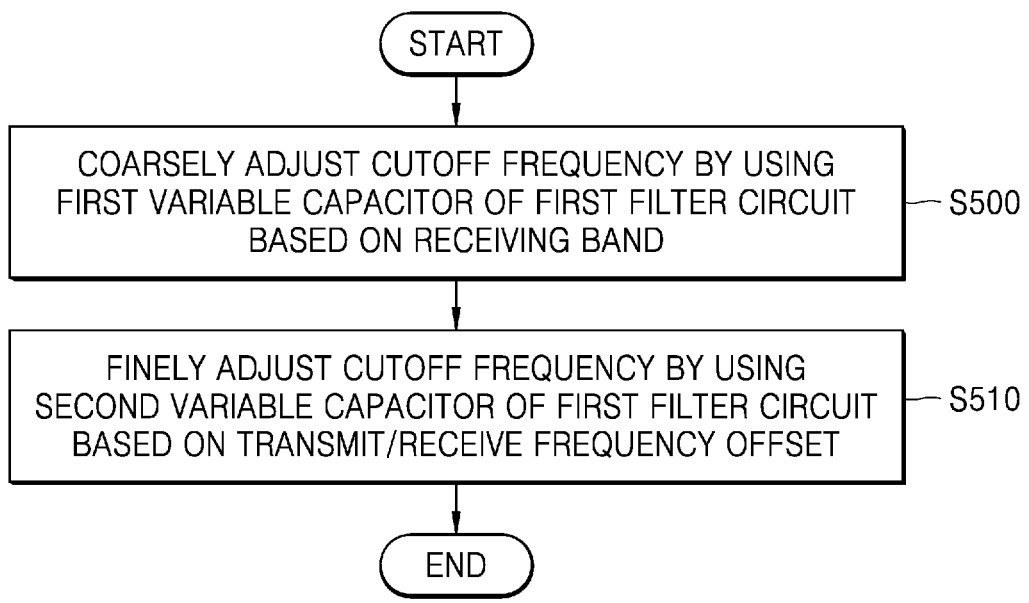
FIG. 13A is a flowchart of an operating method of a wireless communication device, according to an embodiment.
Figure 13B:
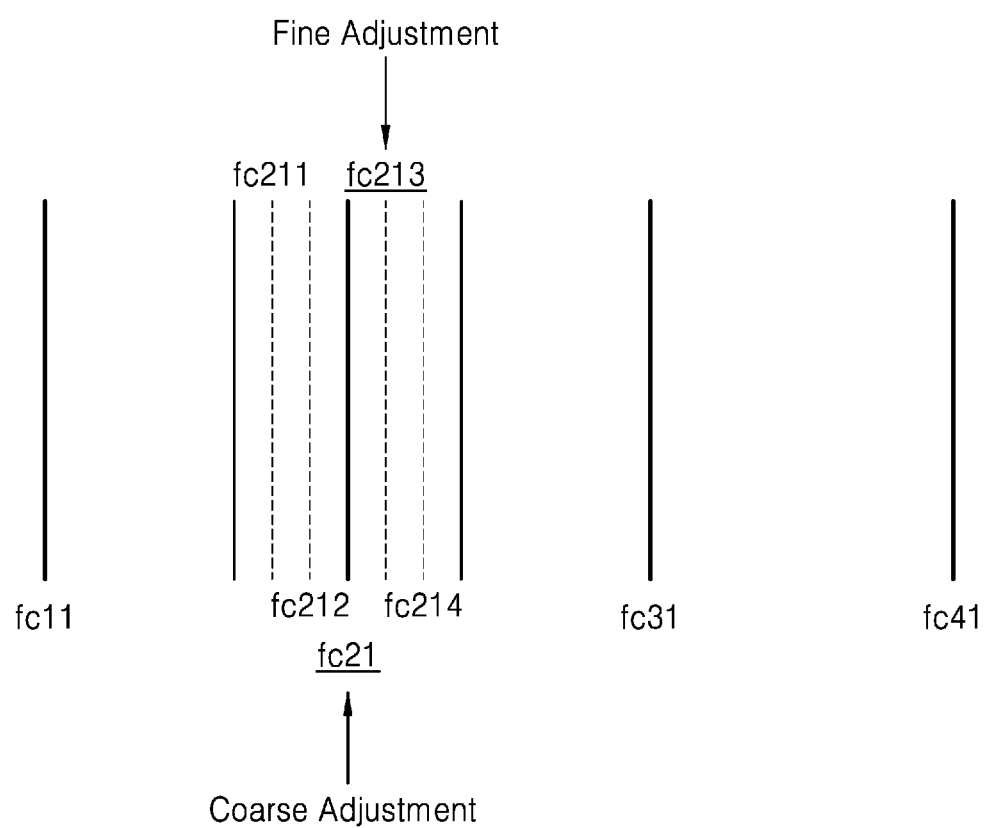
FIG. 13B is a diagram illustrating a method of adjusting the cutoff frequency of a first filter circuit of the wireless communication device, according to an embodiment.

FIG. 13A is a flowchart of an operating method of a wireless communication device, according to an embodiment. FIG. 13B is a diagram illustrating a method of adjusting the cutoff frequency of a first filter circuit of the wireless communication device, according to an embodiment.

Referring to FIG. 13A, the wireless communication device (e.g., wireless communication device 100 of FIG. 1) may coarsely adjust the cutoff frequency of the first filter circuit (e.g., first filter circuit 220*a* of FIG. 3A) by using a first variable capacitor (e.g., first variable capacitor C11*a* of FIG. 3A) of the first filter circuit 220*a* based on a receiving band in operation S500.

The wireless communication device 100 may finely adjust the cutoff frequency of the first filter circuit 220*a* by using a second variable capacitor (e.g., second variable capacitor C21*a* of FIG. 3A) of the first filter circuit 220*a* based on a transmit/receive frequency offset in operation S510.

However, FIG. 13A is just an example, and embodiments of the present disclosure are not limited in this regard. For example, the wireless communication device 100 may coarsely adjust the cutoff frequency of the first filter circuit 220*a* based on the transmit/receive frequency offset by using the first variable capacitor C11*a* of the first filter circuit 220*a* and finely adjust the cutoff frequency of the first filter circuit 220*a* based on the receiving band by using the second variable capacitor C21*a* of the first filter circuit 220*a*.

Referring to FIG. 13B, the wireless communication device 100 may adjust the cutoff frequency of the first filter circuit 220*a* to one of first to fourth cutoff frequencies (e.g., first cutoff frequency fc11, second cutoff frequency fc21, third cutoff frequency fc31, and fourth cutoff frequency fc41) by changing the capacitance of the first variable capacitor C11*a* (e.g., coarse adjustment) based on the receiving band of a current reception signal. For example, the wireless communication device 100 may adjust the cutoff frequency of the first filter circuit 220*a* to the second cutoff frequency fc21 by changing the capacitance of the first variable capacitor C11*a*.

The wireless communication device 100 may adjust the cutoff frequency of the first filter circuit 220*a* to one of second cutoff frequency fc21 and fifth to eighth cutoff frequencies (e.g., fifth cutoff frequency fc211, sixth cutoff frequency fc212, seventh cutoff frequency fc213, and eighth cutoff frequency fc214) by changing the capacitance of the second variable capacitor C21*a* (e.g., fine adjustment) based on the transmit/receive frequency offset between a current receiving band and a current transmission band. For example, the wireless communication device 100 may adjust the cutoff frequency of the first filter circuit 220*a* to the seventh cutoff frequency fc213.

Figure 14A:
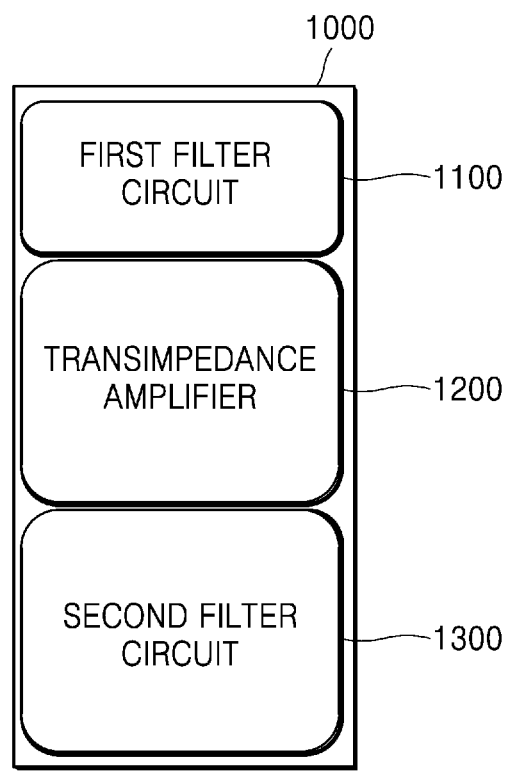
FIG. 14A is a diagram of the layout of an I-to-V converter, according to an embodiment.
Figure 14B:
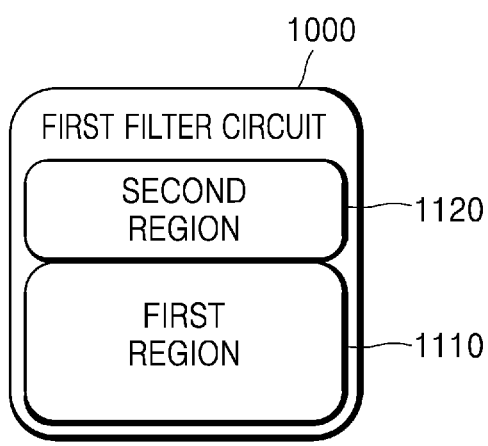
FIG. 14B is a diagram of the layout of a first filter circuit in FIG. 14A, according to an embodiment.

FIG. 14A is a diagram of the layout of an I-to-V converter 1000, according to an embodiment. FIG. 14B is a diagram of the layout of a first filter circuit 1100 in FIG. 14A, according to an embodiment. The I-to-V converter 1000 of FIG. 14B may include or may be similar in many respects to the receiver I-to-V converter 133 of FIG. 1 and may include additional features not mentioned above. The first filter circuit 1100 of FIGS. 14A and 14B may include or may be similar in many respects to at least one of the first filter circuits 133_1 and 220 of FIGS. 1 and 2, and may include additional features not mentioned above.

Referring to FIG. 14A, the I-to-V converter 1000 may include the first filter circuit 1100, a transimpedance amplifier 1200, and a second filter circuit 1300.

The first filter circuit 1100 may be disposed at the side of the input terminal of the transimpedance amplifier 1200, and the second filter circuit 1300 may be disposed at the side of the output terminal of the transimpedance amplifier 1200.

In an embodiment, in the layout of the I-to-V converter 1000, the area of the first filter circuit 1100 may be smaller than the area of the second filter circuit 1300. However, this is just an example, and embodiments of the present disclosure are not limited in this regard. For example, the area of the first filter circuit 1100 may be the same as or larger than the area of the second filter circuit 1300.

Referring to FIG. 14B, the layout of the first filter circuit 1100 may include a first region 1110, in which a first variable capacitor is arranged (e.g., disposed), and a second region 1120, in which a second variable capacitor is arranged.

In an embodiment, the first region 1110 may be larger than the second region 1120. Alternatively or additionally, the first region 1110 may be closer to the transimpedance amplifier 1200 in FIG. 14A than the second region 1120.

However, FIG. 14B is just an example, and embodiments of the present are not limited in this regard. For example, the second variable capacitor may be arranged in the first region 1110, and the first variable capacitor may be arranged in the second region 1120.

Figure 15:
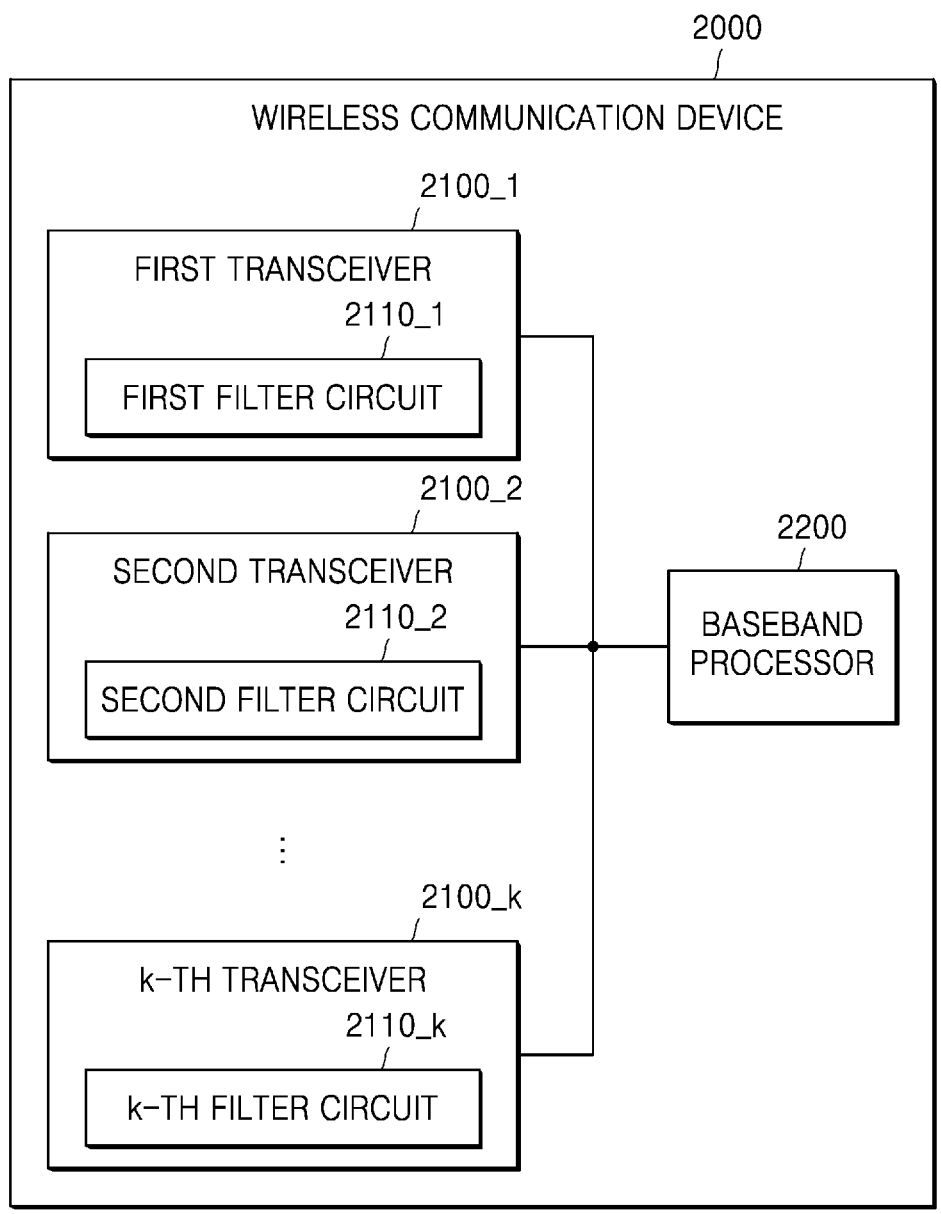
FIG. 15 is a block diagram of a wireless communication device, according to an embodiment.

FIG. 15 is a block diagram of a wireless communication device 2000, according to an embodiment. The wireless communication device 2000 may include or may be similar in many respects to the wireless communication device 100 of FIG. 1 and may include additional features not mentioned above.

Referring to FIG. 15, the wireless communication device 2000 may include first to k-th transceivers (e.g., 2100_1 to 2100_*k*, where k is an integer greater than zero (0), hereinafter "2100" generally) and a baseband processor 2200.

The transceivers 2100 may respectively include first filter circuits 2110_1 to 2110_k (hereinafter "2110" generally). Each of the first filter circuits 2110 may correspond to the first filter circuit 1100 of FIG. 14B. The first filter circuits 2110 may be respectively included in receiver circuits respectively included in the transceivers 2100.

In an embodiment, the first filter circuit 2110_1 of the first transceiver 2100_1 may perform the operation of a low-pass filter, taking into account a signal leaking from a transmitter circuit of the first transceiver 2100_1 and a signal leaking from at least one of the second to k-th transceivers 2100_2 to 2100_k. Alternatively or additionally, the cutoff frequency of the first filter circuit 2110_1 may be adjusted, based at least on a frequency band related to the signal leaking from the at least one of the second to k-th transceivers 2100_2 to 2100_k, a transmit/receive frequency offset, and/or the like.

In an optional or additional embodiment, the second filter circuit 2110_2 of the second transceiver 2100_2 may perform the operation of a low-pass filter, taking into account a signal leaking from a transmitter circuit of the second transceiver 2100_2 and a signal leaking from at least one of the first transceiver 2100_1 and the third to k-th transceivers 2100_3 to 2100_k. Alternatively or additionally, the cutoff frequency of the second filter circuit 2110_2 may be adjusted, based on at least a frequency band related to the signal leaking from the at least one of the first transceiver 2100_1 and the third to k-th transceivers 2100_3 to 2100_k, a transmit/receive frequency offset, and/or the like.

In another optional or additional embodiment, the k-th filter circuit 2110_k of the k-th transceiver 2100_k may perform the operation of a low-pass filter, taking into account a signal leaking from a transmitter circuit of the k-th transceiver 2100_k and a signal leaking from at least one of the first to (k−1)-th transceivers 2100_1 to 2100_k−1. Alternatively or additionally, the cutoff frequency of the k-th filter circuit 2110_k may be adjusted, based on at least a frequency band related to the signal leaking from the at least one of the first to (k−1)-th transceivers 2100_1 to 2100_k−1, a transmit/receive frequency offset, and/or the like.

In an embodiment, the baseband processor 2200 may generally control the operations of the transceivers 2100 and generate a control signal for controlling the cutoff frequency of each of the first filter circuits 2110. Alternatively or additionally, the baseband processor 2200 may control activation and/or deactivation of each of the first filter circuits 2110.

Figure 16:
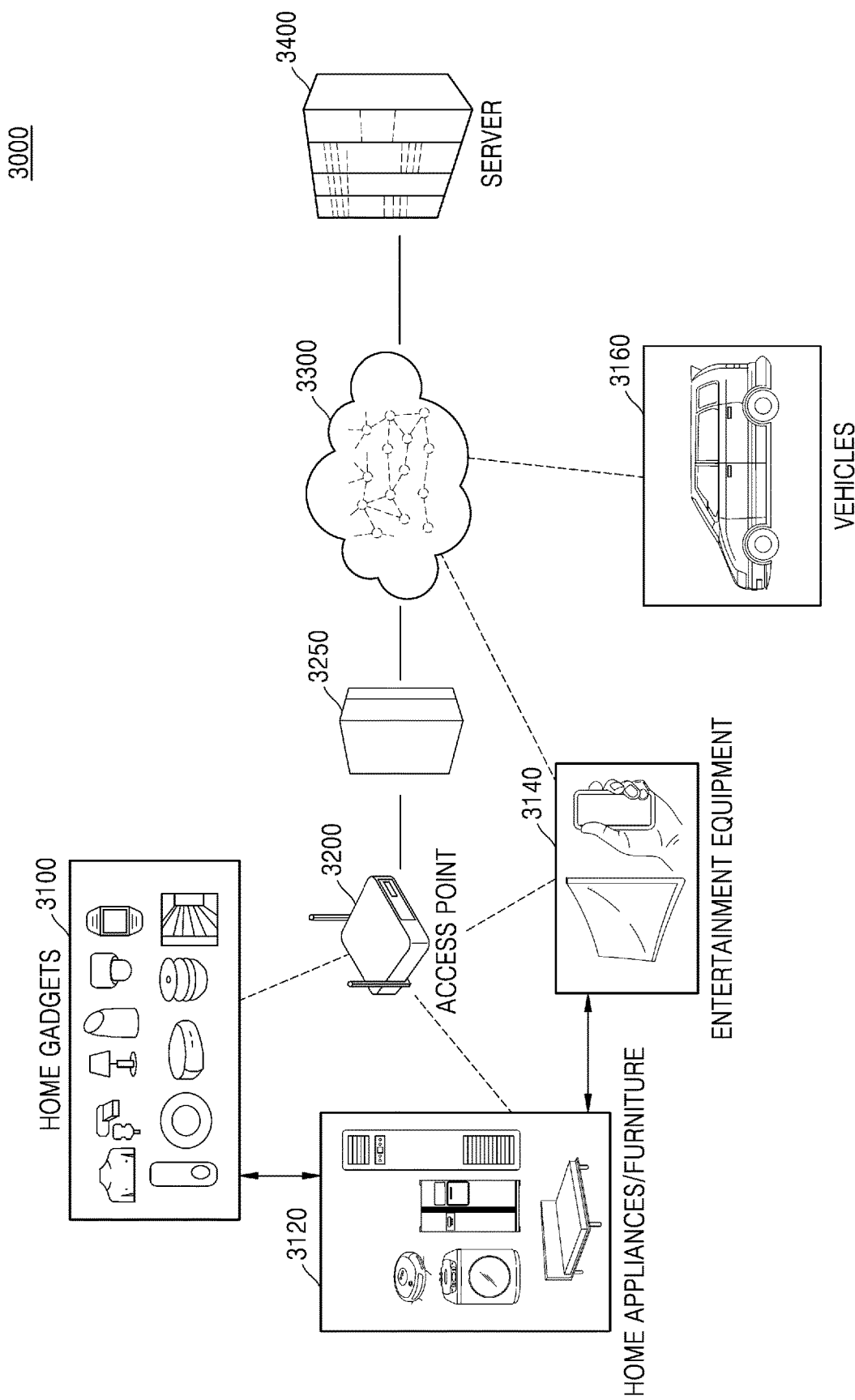
FIG. 16 is a conceptual diagram of an Internet of things (IoT) network system, according to various embodiments.

FIG. 16 is a conceptual diagram of an Internet of things (IoT) network system 3000, according to various embodiments.

Referring to FIG. 16, the IoT network system 3000 may include a plurality of IoT devices, an access point 3200, a gateway 3250, a wireless network 3300, and a server 3400. IoT may refer to a network established among devices using wired and/or wireless communications.

The IoT devices may be grouped by the characteristics thereof. For example, the IoT devices may be divided into a group of home gadgets 3100, a group of home appliances/furniture 3120, a group of entertainment equipment 3140, and a group of vehicles 3160. However, these groupings are just an example, and embodiments of the present are not limited in this regard. For example, the IoT devices may be grouped according to other characteristics (e.g., throughput, processing capacity, communication frequency, network connection type, and the like) without deviating from the scope of the present disclosure.

In an embodiment, a plurality of IoT devices (e.g., the home gadgets 3100, the home appliances/furniture 3120, and the entertainment equipment 3140) may be connected to a communication network through the access point 3200 and/or another IoT device. For example, the access point 3200 may be embedded inside another IoT device. The gateway 3250 may change a protocol to allow the access point 3200 to access an external wireless network (e.g., wireless network 3300). That is, the IoT devices (e.g., the home gadgets 3100, the home appliances/furniture 3120, and the entertainment equipment 3140) may be connected to an external communication network (e.g., wireless network 3300) through the gateway 3250. In optional or additional embodiments, the IoT devices (e.g., the entertainment equipment 3140, the vehicles 3160) may connect to an external communication network (e.g., wireless network 3300) directly (e.g., without the use of an access point 3200 and/or a gateway 3250). The wireless network 3300 may include the Internet and/or a public network.

Alternatively or additionally, the IoT devices (e.g., the home gadgets 3100, the home appliances/furniture 3120, and the entertainment equipment 3140, and the vehicles 3160) may be connected to the server 3400, which may provide one or more services, through the wireless network 3300. In some embodiments, users may use at least one service of the one or more services through at least one of the IoT devices (e.g., the home gadgets 3100, the home appliances/furniture 3120, the entertainment equipment 3140, and the vehicles 3160).

According to some embodiments, each of the IoT devices (e.g., the home gadgets 3100, the home appliances/furniture 3120, the entertainment equipment 3140, and the vehicles 3160) may include a receiver circuit with a filter circuit configured to remove signals leaking in a certain mode and/or situation (e.g., scenario), as described above with reference to FIGS. 1-15. Consequently, the IoT devices (e.g., the home gadgets 3100, the home appliances/furniture 3120, the entertainment equipment 3140, and the vehicles 3160) may have increased reception performance, as well as, potentially meet design constraints regarding a size and/or weight of the IoT devices, when compared to related IoT devices. As a result, the IoT devices may provide quality service for users, when compared to related IoT devices.

In the embodiments, terms including ordinal numbers, such as "first," "second," "third," etc., have been used to describe various components according to the present disclosure. However, the above terms are used only to distinguish one component from another and do not limit the present disclosure. For example, the above terms have no sequential implication or any form of numerical meaning. In the embodiments described above, components according to embodiments have been referred to using blocks. The blocks may be implemented by various hardware devices, such as an integrated circuit (IC), an application specific IC (ASIC), a field programmable gate array (FPGA), and a complex programmable logic device (CPLD), firmware run in hardware devices, software like applications, or combinations of hardware devices and software. The blocks may include circuits constituted of semiconductor devices of an IC or circuits registered as intellectual properties (IPs).

While the present disclosure has been particularly shown and described with reference to embodiments thereof, it will be understood that various changes in form and details may be made therein without departing from the spirit and scope of the following claims.

What is claimed is:

1. A current-to-voltage converter for converting a current signal into a voltage signal, comprising:
   a transimpedance amplifier;

a first filter circuit coupled between an input node of the transimpedance amplifier and an internal node of the transimpedance amplifier, the first filter circuit being configured to operate as a low-pass filter with respect to the current signal; and a second filter circuit coupled between the input node of the transimpedance amplifier and an output node of the transimpedance amplifier, the second filter circuit being configured to operate as a band-pass filter with respect to the current signal.

2. The current-to-voltage converter of claim 1, wherein:

the transimpedance amplifier comprises a first amplifier and a second amplifier, the second amplifier is coupled in series to the first amplifier, the first amplifier and the second amplifier are configured to sequentially perform amplification, and the internal node of the transimpedance amplifier is disposed between an output terminal of the first amplifier and an input terminal of the second amplifier.

3. The current-to-voltage converter of claim 2, wherein the first filter circuit comprises:

a first variable capacitor having a first terminal coupled to the input node of the transimpedance amplifier and an opposite second terminal coupled to the internal node of the transimpedance amplifier.

4. The current-to-voltage converter of claim 3, wherein the first variable capacitor comprises:

a plurality of first capacitors coupled in parallel to each other, and a plurality of first switches configured to selectively couple respective capacitors of the plurality of first capacitors to at least one of the input node of the transimpedance amplifier and the internal node of the transimpedance amplifier.

5. The current-to-voltage converter of claim 3, wherein the first filter circuit further comprises a second variable capacitor having a third terminal coupled to the input node of the transimpedance amplifier and an opposite fourth terminal that is grounded.

6. The current-to-voltage converter of claim 3, wherein the first variable capacitor is configured to adjust a capacitance of the first variable capacitor to cause the second amplifier to operate in a non-saturated region.

7. The current-to-voltage converter of claim 3, wherein the second filter circuit comprises:

a third variable capacitor having a third terminal coupled to the input node of the transimpedance amplifier and an opposite fourth terminal coupled to the output node of the transimpedance amplifier; and a variable resistor coupled in parallel to the third variable capacitor between the input node of the transimpedance amplifier and the output node of the transimpedance amplifier.

8. The current-to-voltage converter of claim 1, wherein the low-pass filter of the first filter circuit is configured to:

adjust a cutoff frequency of the low-pass filter based on a bandwidth of the band-pass filter of the second filter circuit.

9. A transceiver, comprising:

a receiver circuit configured to:

frequency down-convert a first reception signal in a first radio frequency (RF) band; and output a second reception signal in a baseband; and a transmitter circuit configured to:

frequency up-convert a first transmission signal in the baseband; and output a second transmission signal in a second RF band, wherein the receiver circuit comprises a current-to-voltage converter configured to convert a current signal corresponding to the first reception signal into a voltage signal corresponding to the second reception signal, and wherein the current-to-voltage converter comprises:

a transimpedance amplifier; and a first filter circuit coupled between an input node of the transimpedance amplifier and an internal node of the transimpedance amplifier, the first filter circuit being configured to operate as a low-pass filter with respect to the current signal corresponding to the first reception signal.

10. The transceiver of claim 9, wherein the first filter circuit is further configured to:

selectively activate based on whether the transmitter circuit and the receiver circuit operate in a frequency division duplex (FDD) mode.

11. The transceiver of claim 9, wherein the first filter circuit is further configured to:

selectively activate based on whether a transmit/receive frequency offset is less than or equal to a reference value, the transmit/receive frequency offset corresponding to a frequency distance between the first RF band and the second RF band.

12. The transceiver of claim 9, wherein the low-pass filter of the first filter circuit is configured to:

adjust a cutoff frequency of the low-pass filter based on a bandwidth of the first RF band.

13. The transceiver of claim 9, wherein the low-pass filter of the first filter circuit is configured to adjust a cutoff frequency of the low-pass filter based on a transmit/receive frequency offset corresponding to a frequency distance between the first RF band and the second RF band.

14. The transceiver of claim 9, wherein the current-to-voltage converter further comprises a second filter circuit coupled between the input node of the transimpedance amplifier and an output node of the transimpedance amplifier, the second filter circuit being configured to operate as a band-pass filter with respect to the current signal corresponding to the first reception signal.

15. The transceiver of claim 9, wherein:

the transimpedance amplifier comprises a first amplifier and a second amplifier, the second amplifier is coupled in series to the first amplifier, the first amplifier and the second amplifier are configured to sequentially perform amplification, and the internal node of the transimpedance amplifier is disposed between an output terminal of the first amplifier and an input terminal of the second amplifier.

16. The transceiver of claim 9, wherein the first filter circuit comprises:

a first variable capacitor having a first terminal coupled to the input node of the transimpedance amplifier and an opposite second terminal coupled to the internal node of the transimpedance amplifier; and a second variable capacitor having a third terminal coupled to the input node of the transimpedance amplifier and an opposite fourth terminal that is grounded.

17. The transceiver of claim 16, wherein the first filter circuit is further configured to:

perform a coarse adjustment of a cutoff frequency of the low-pass filter by adjusting a first capacitance of the first variable capacitor; and perform a fine adjustment of the cutoff frequency of the low-pass filter by adjusting a second capacitance of the second variable capacitor.

18. The transceiver of claim 16, wherein a first size of the first variable capacitor is greater than a second size of the second variable capacitor.

19. A wireless communication device, comprising:
a first transceiver comprising a first transmitter circuit and a first receiver circuit;
a second transceiver comprising a second transmitter circuit and a second receiver circuit; and
a baseband processor configured to:
process reception signals provided from the first transceiver and the second transceiver; and
process transmission signals to be provided to the first transceiver and the second transceiver,
wherein the first receiver circuit comprises a current-to-voltage converter comprising a transimpedance amplifier and a first filter circuit between an input node of the transimpedance amplifier and an internal node of the transimpedance amplifier, the first filter circuit being configured to operate as a low-pass filter with respect to a current signal input to the transimpedance amplifier, and wherein the baseband processor is further configured to generate a control signal that adjusts a cutoff frequency of the low-pass filter of the first filter circuit.

20. The wireless communication device of claim 19, wherein the baseband processor is further configured to activate the first filter circuit when the first receiver circuit and at least one of the first transmitter circuit and the second transmitter circuit operate in a frequency division duplex (FDD) mode.

* * * * *